United States Patent
Gu et al.

(10) Patent No.: US 10,073,182 B2
(45) Date of Patent: Sep. 11, 2018

(54) COMBINATION MODEL FOR PREDICTING STIFFNESS COEFFICIENTS ABSENT STONELEY WAVE VELOCITY DATA

(71) Applicant: Halliburton Energy Services, Inc., Houston, TX (US)

(72) Inventors: Ming Gu, Houston, TX (US); John Andrew Quirein, Georgetown, TX (US); Mehdi Eftekharifar, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 294 days.

(21) Appl. No.: 15/038,762

(22) PCT Filed: Jan. 12, 2016

(86) PCT No.: PCT/US2016/012991
§ 371 (c)(1),
(2) Date: May 24, 2016

(87) PCT Pub. No.: WO2016/118360
PCT Pub. Date: Jul. 28, 2016

(65) Prior Publication Data
US 2018/0196153 A1    Jul. 12, 2018

Related U.S. Application Data

(60) Provisional application No. 62/106,950, filed on Jan. 23, 2015.

(51) Int. Cl.
*G01V 1/00* (2006.01)
*G01V 1/28* (2006.01)
(Continued)

(52) U.S. Cl.
CPC .............. *G01V 1/306* (2013.01); *G01V 1/282* (2013.01); *G01V 1/284* (2013.01); *G01V 1/50* (2013.01); *G01V 2210/626* (2013.01)

(58) Field of Classification Search
CPC .............................. G01V 1/306; G01V 1/282
(Continued)

(56) References Cited

U.S. PATENT DOCUMENTS 5,672,830 A    9/1997 Rogers et al.
6,714,873 B2   3/2004 Bakulin et al.
(Continued)

OTHER PUBLICATIONS

Quirein, et al., Predicting the Stiffness Tensor of a Transversely Isotropic Medium when the Vertical Poisson's Ratio is Less than the Horrizontal Poisson's Ratio, SPWLA 55th Anual Logging Symposium, 2014.
(Continued)

*Primary Examiner* — Eman Alkafawi
(74) *Attorney, Agent, or Firm* — McDermott Will & Emery LLP

(57) ABSTRACT

A combination model combining a velocity regression method (V-reg) with the modified ANNIE model may be used to predict the stiffness coefficients, $C_{ij}$, in a transversely isotropic medium without using the Stoneley wave velocity. The stiffness coefficients may be used to characterize the surrounding formation, which may be used in hydraulic fracture modeling, stage/perforation design, and well completion operations (e.g., perforating and fracturing operations).

30 Claims, 23 Drawing Sheets

(51) Int. Cl.
  *G01V 1/30*    (2006.01)
  *G01V 1/50*    (2006.01)
(58) Field of Classification Search
  USPC ..................................................... 702/14, 18
  See application file for complete search history.

(56) References Cited

U.S. PATENT DOCUMENTS

2007/0097787 A1    5/2007   Moos
2009/0225628 A1    9/2009   Sayers
2010/0312534 A1    12/2010  Xu et al.
2014/0365420 A1*   12/2014  Jocker ...................... G01V 1/48
                                                         706/52

OTHER PUBLICATIONS

Halliburton Brochure entitled FracInsightsm Service—"Where to Frac", 2014.
International Search Report and Written Opinion received in corresponding International Application No. PCT/US2016/012991, dated Mar. 30, 2016.

* cited by examiner

COMBINATION MODEL FOR PREDICTING STIFFNESS COEFFICIENTS ABSENT STONELEY WAVE VELOCITY DATA

BACKGROUND

The present application relates to predicting stiffness coefficients ($C_{ij}$) in a transversely isotropic medium such as laminated shale or shale with orthogonal set of transverse natural fractures.

Hydrocarbon shale formations have very low permeability and, therefore, are hydraulically fractured (i.e., fracked) to enhanced hydrocarbon recovery therefrom. In some instances, the fracturing operations may be simulated to identify target zones in the formation for drilling wells and identifying perforating and fracturing locations ("sweet spots"). Simulating a fracturing operation often involves two steps: a stage/perforation design that models perforations along the wellbore and then a hydraulic fracture model that investigates how fractures extend from perforations in the wellbore into the surrounding formation. The stage/perforation designs typically implemented produce a profile (e.g., as a graph or map) of closure stress versus wellbore depth taking into account rock brittleness, both of which are predicted from the elastic moduli profiles of the formation. The hydraulic fracture modeling also requires the depth profile of closure stress along with the Young's modulus and Poisson's ratio in an input.

Within shale formations, fracturing operation simulations are influenced by extensive horizontal laminations of the formation. The laminations strongly influence the fracture height because of the differences in the rock mechanical properties normal (perpendicular) and parallel to the bedding planes. In order to accurately predict fracturing height from logs in this environment, these mechanical property differences must be taken into account. The mechanical properties normal and parallel to the bedding may be predicted based on logs of the Young's Modulus and Poisson's Ratio parallel to bedding planes (referred to as the horizontal Young's Modulus ($E_{horz}$) and Poisson's Ratio ($v_{horz}$), respectively) and also the Young's Modulus and Poisson's Ratio normal to the bedding planes (referred to as the vertical Young's Modulus ($E_{vert}$) and Poisson's Ratio ($v_{vert}$), respectively).

The stiffness matrix for anisotropic materials with orthotropic symmetry (e.g., a vertically transverse isotropic (VTI) rock such as laminated shale without natural fractures) may be expressed with various stiffness coefficients ($C_{ij}$) as Equation (1).

$$C_{ijkl} = \begin{bmatrix} C_{11} & C_{12} & C_{13} & 0 & 0 & 0 \\ C_{12} & C_{22} & C_{23} & 0 & 0 & 0 \\ C_{13} & C_{23} & C_{33} & 0 & 0 & 0 \\ 0 & 0 & 0 & C_{44} & 0 & 0 \\ 0 & 0 & 0 & 0 & C_{55} & 0 \\ 0 & 0 & 0 & 0 & 0 & C_{66} \end{bmatrix} \quad \text{Equation (1)}$$

The five independent elastic coefficients of the transversely isotropic media are $C_{11}$, $C_{33}$, $C_{12}$, $C_{13}$, and $C_{44}$. Alternatively, the elastic coefficients selected may be $C_{33}$, $C_{11}$, $C_{13}$, $C_{44}$, and $C_{66}$, because of the relationship between $C_{66}$, $C_{11}$, and $C_{12}$ ($C_{66}=(C_{11}-C_{12})/2$), which is due to the VTI symmetry.

The elastic moduli (referred to as "dynamic moduli" when obtained from velocity measurements) can be determined in both the vertical and horizontal directions using Equations (2)-(5), which allows for anisotropy to be quantified by wireline acoustical logging measurements.

$$E_{vert} = C_{33} - \frac{2C_{13}^2}{C_{11} - C_{12}} \quad \text{Equation (2)}$$

$$E_{horz} = \frac{(C_{11} - C_{12})*(C_{11}C_{33} - 2C_{13}^2 + C_{12}C_{33})}{C_{11}C_{33} - C_{13}^2} \quad \text{Equation (3)}$$

$$v_{vert} = \frac{C_{13}}{C_{11} + C_{12}} \quad \text{Equation (4)}$$

$$v_{horz} = \frac{C_{33}C_{12} + C_{13}^2}{C_{33}C_{11} - C_{13}^2} \quad \text{Equation (5)}$$

According to Equations (2)-(5), fully characterizing geomechanical properties of laminated shale formations requires deriving or measuring the five independent elastic coefficients. In a vertical well, $C_{33}$ and $C_{44}$ are calculated directly from the velocity of the vertically propagating p- and s-waves; $C_{66}$ is estimated from the Stoneley wave velocity measured by an advanced sonic tool in open hole; and $C_{11}$ and $C_{13}$ may be obtained from an empirical model. For example, ANNIE model and modified ANNIE model workflows are provided in FIGS. 1A and 1B, respectively. (ANNIE model was developed in 1996 by Shoenberg, Muir, and Sayers, and is generally understood in the art apart from the inventive aspects disclosed herein).

However, empirical models for characterizing the VTI stiffness tensor require Stoneley wave velocity as input, which prevents their applicability in the cased-hole conditions or when sonic tools without Stoneley wave measurement capacity are used. (A Stoneley wave is generally understood in the art apart from the inventive aspects disclosed herein, and was named after Dr. Robert Stoneley who discovered it.)

Some have proposed a method to do the interpretation without Stoneley wave velocity based on the widely observed near-linear relationships between measured 0°, 45°, and 90° p- and s-wave velocities from different shales (FIGS. 2A and 2B). Based on those linear relationships, wave velocities at different angles can be derived from the log measured wave velocity (e.g., 0° in a vertical well or 90° in a horizontal well). These velocities may then be used with a density log to compute the stiffness coefficients. More specifically, $C_{33}$ and $C_{44}$ are directly calculated from the measured p-wave velocity at 0° ($V_p(0°)$) and the measured s-wave velocity at 0° ($V_s(0°)$), respectively. $C_{11}$ and $C_{66}$ are directly calculated from the predicted p-wave velocity at 90° ($V_p(90°)$) from FIG. 2A and the predicted s-wave velocity at 90° ($V_s(90°)$) from FIG. 2B, respectively. $C_{13}$ is calculated from predicted p-wave velocity at 45° ($V_p(45°)$) from FIG. 2A. From FIGS. 2A and 2B, it is noted that the 90° velocity has poorer linear relationship with 0° velocity as compared with 45° data. The scatter indicator $R^2$ is around 20% lower. The root-mean-square deviation (RMSD) of 90° velocity is almost double of the RMSD of 45° velocity. These poor linear relationships may lead to significant error when used in stiffness coefficient calculations, which may result in erroneous calculation of stress and elastic moduli, and hence result in inefficient or ineffective fracturing operations.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present application relates to predicting the stiffness coefficients, $C_{ij}$, in a transversely isotropic medium. More specifically, the embodiments described herein allow for such predictions without using the Stoneley wave velocity using the combination model of the present application. The combination model of the present disclosure combines a velocity regression (V-reg) model with a modified ANNIE (M-ANNIE) model.

The embodiments described herein may use sonic logging data for both vertical and horizontal wells in a transversely isotropic medium (e.g., laminated shale or an isotropic rock with parallel vertical natural fractures) in the combination model of the present application for predicting the stiffness coefficients ($C_{33}$, $C_{44}$, $C_{66}$, $C_{11}$, $C_{13}$, and $C_{12}$) of the stiffness tensor when the Stoneley wave velocity is missing. Then, in a fracturing model, the preferred drilling, perforating, and fracturing locations may be determined for the formation with greater accuracy absent Stoneley wave velocity data.

Figure 1B:
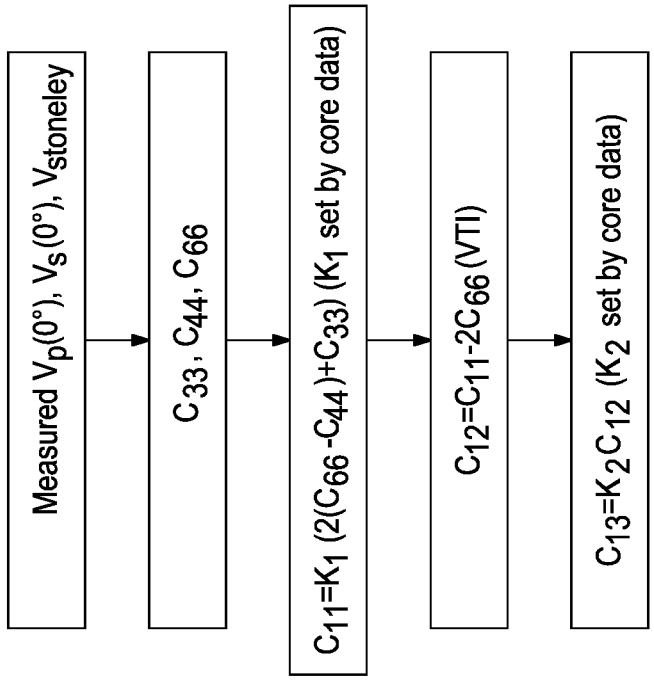
FIG. 1 provides workflows of (A) ANNIE and (B) modified ANNIE models.
Figure 1A:
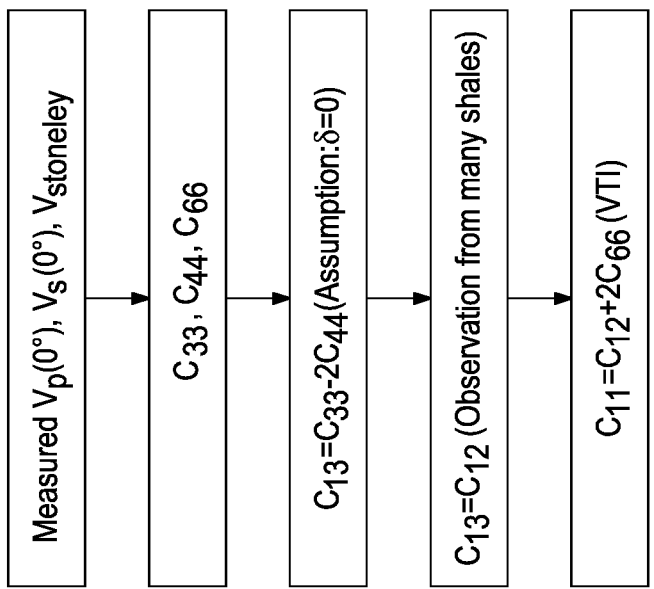
Figure 2A:
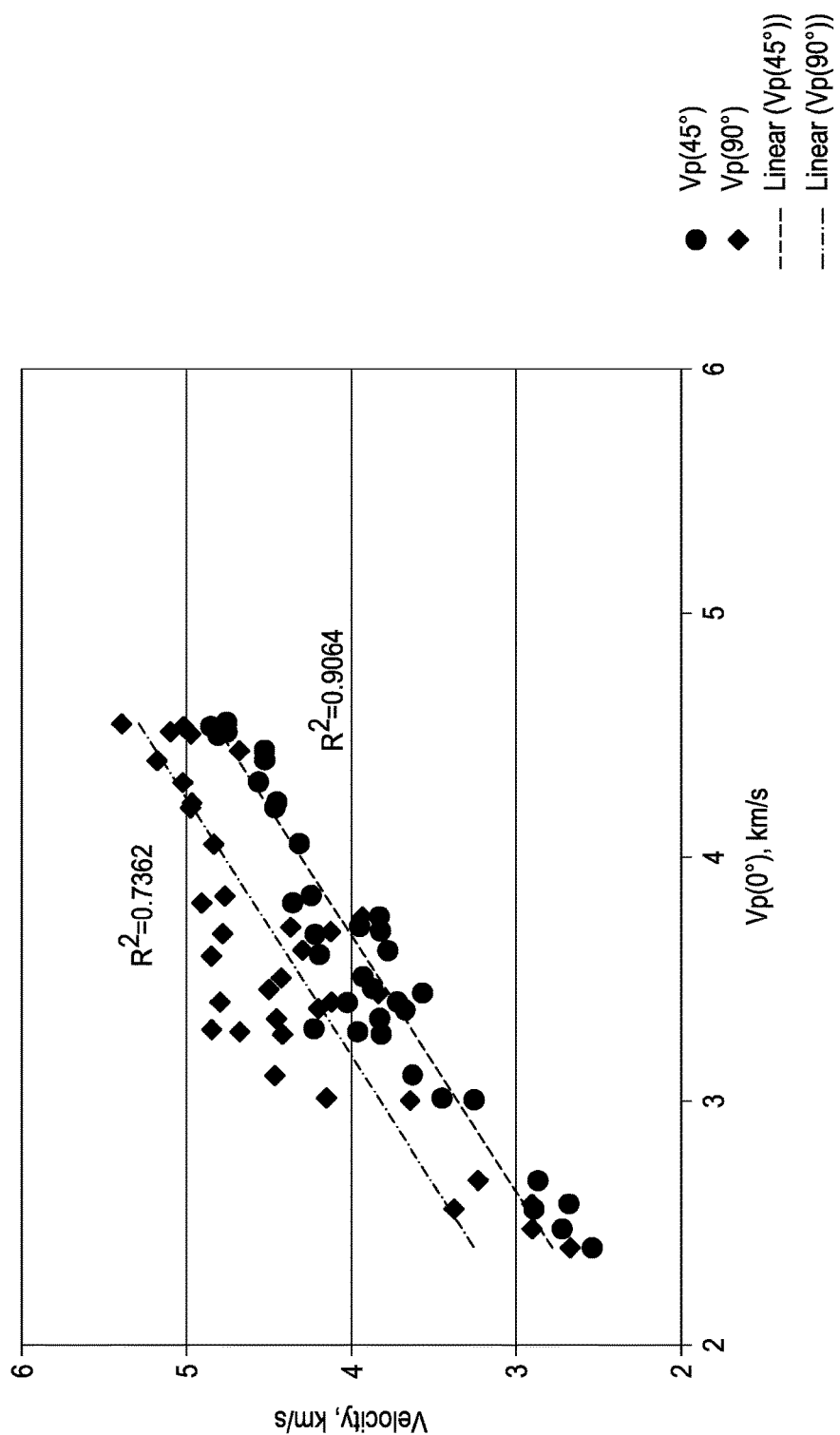
FIG. 2 provides (A) $V_p$ data with linear regression analysis and (B) $V_s$ data with linear regression analysis.
Figure 2B:
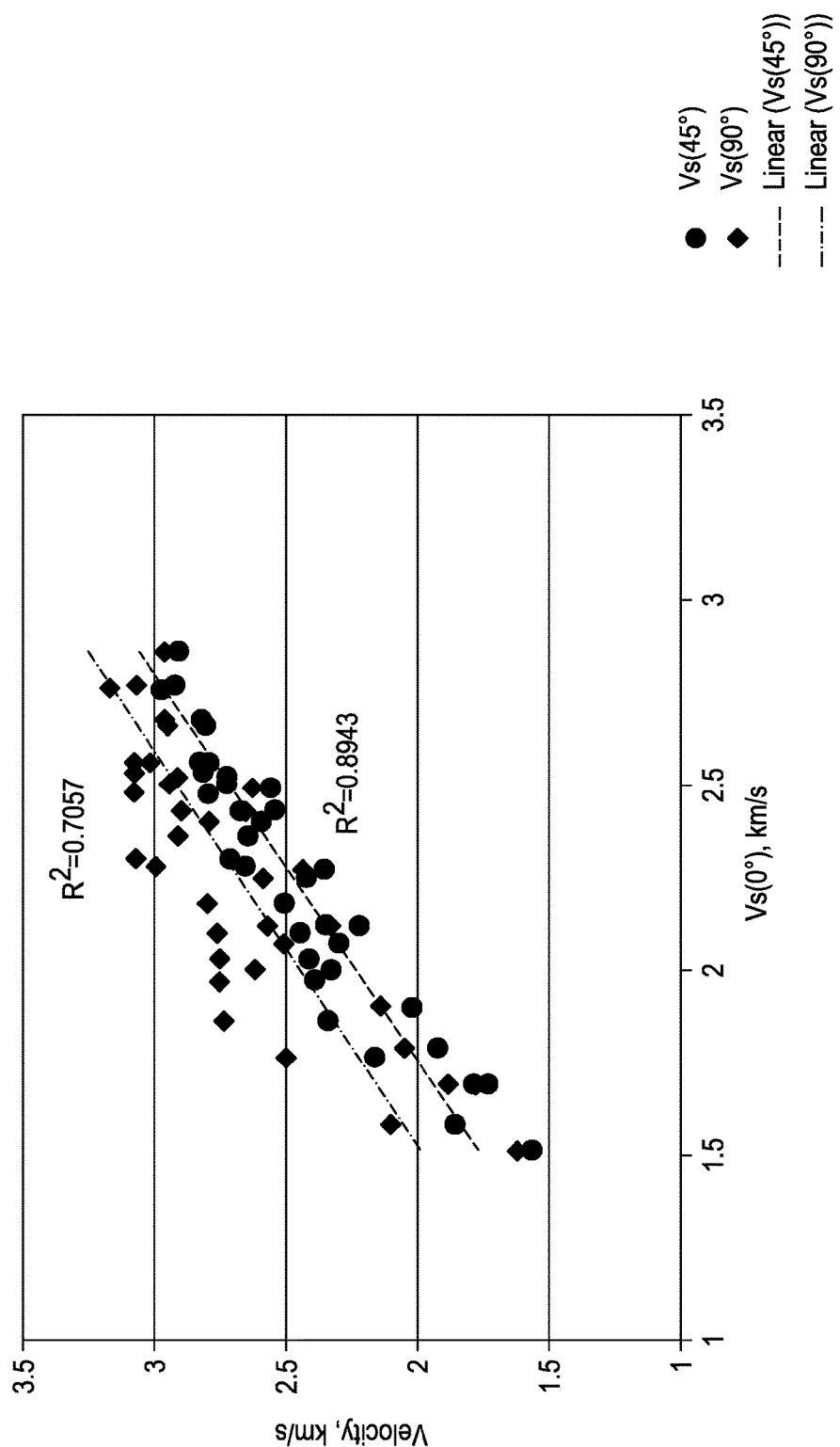
Figure 3:
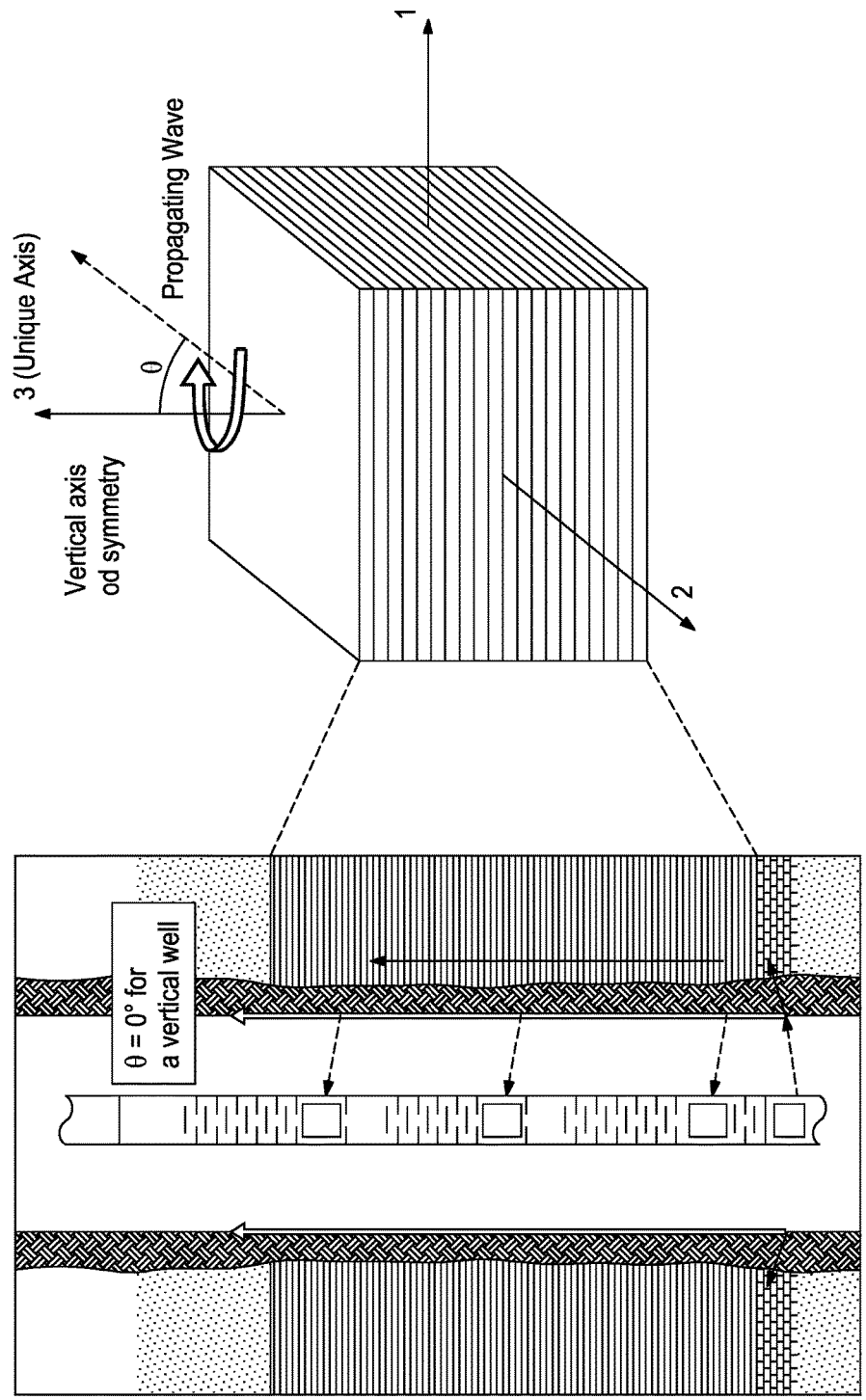
FIG. 3 illustrates measuring a wave velocity at 0° in a vertical well passing through a transversely isotropic medium.

FIG. 3 illustrates measuring a wave velocity at 0° in a vertical well passing through a transversely isotropic medium. The angle θ described herein relative to the wave velocity is the angle between the unique axis (axis normal to the bedding plane) and the propagation direction of the sonic wave. The 0° p- and s-waves are used to calculate $C_{33}$ and $C_{44}$, respectively. Sonic waves propagating at other different angles have different velocities due to the laminated nature of shale. Those velocities cannot be measured directly from the vertical tool.

Figure 4:
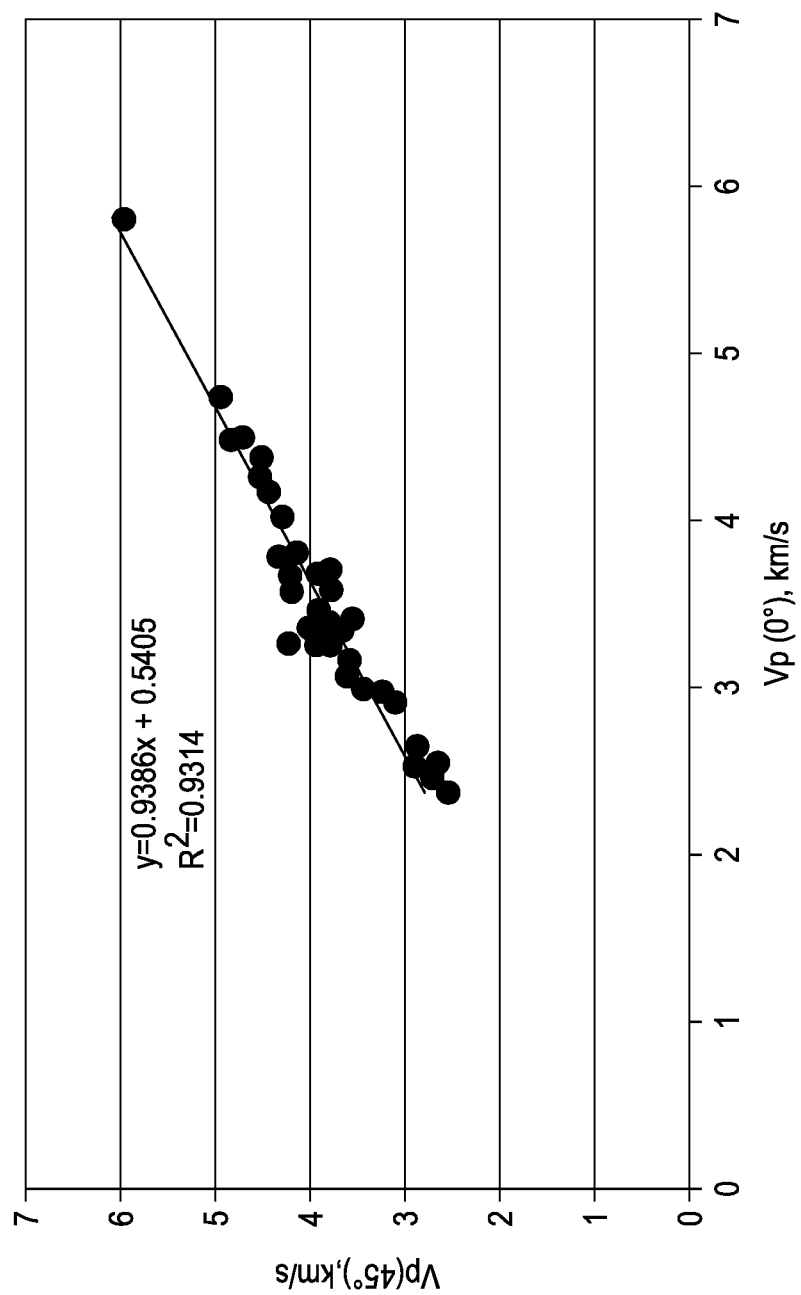
FIG. 4 is measured core data of the sonic wave velocity at 45° vs. velocity at 0° for p-waves (i.e., $V_p(45°)$ vs $V_p(0°)$) available in the literature from eight different shales across the world.
Figure 5:
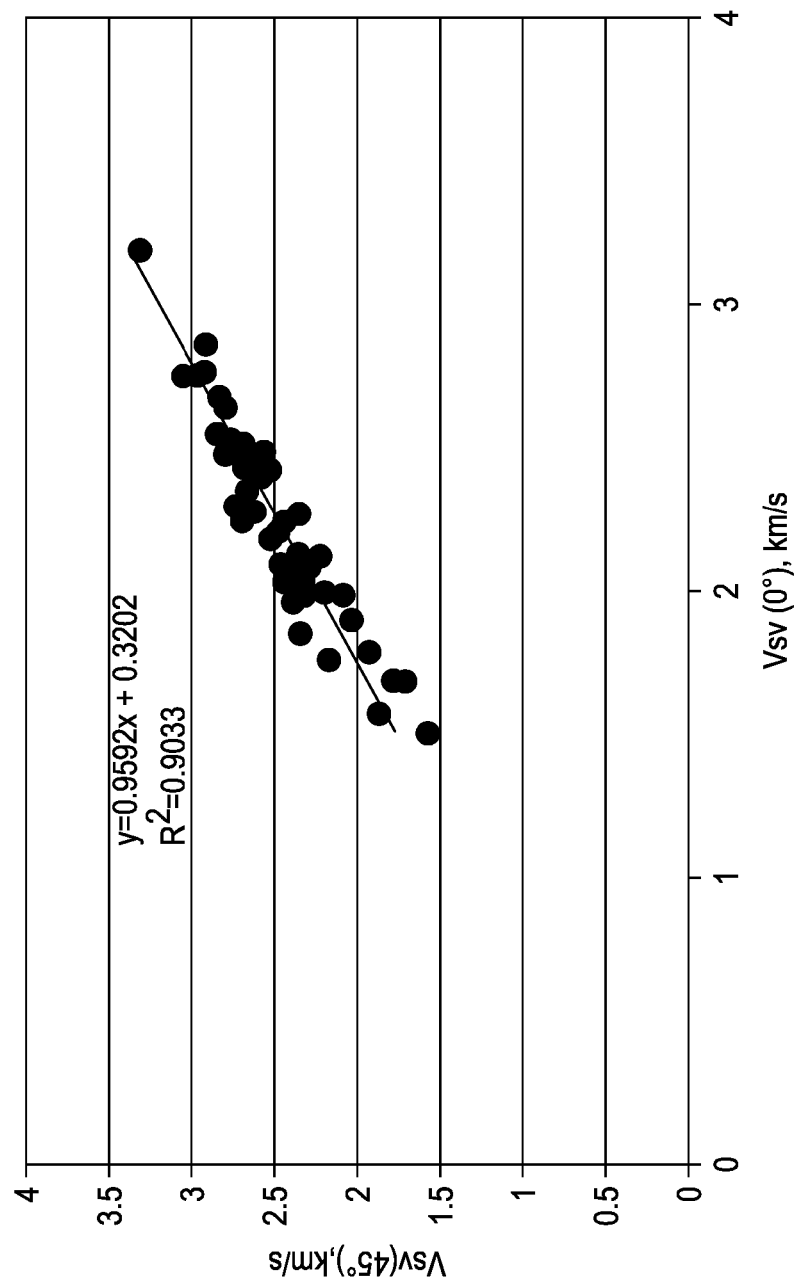
FIG. 5 is measured core data of the sonic wave velocity at 45° vs. velocity at 0° for s-waves with vertical polarization (i.e., $V_{sv}(45°)$ vs $V_{sv}(0°)$) available in the literature from eight different shales across the world.
Figure 6:
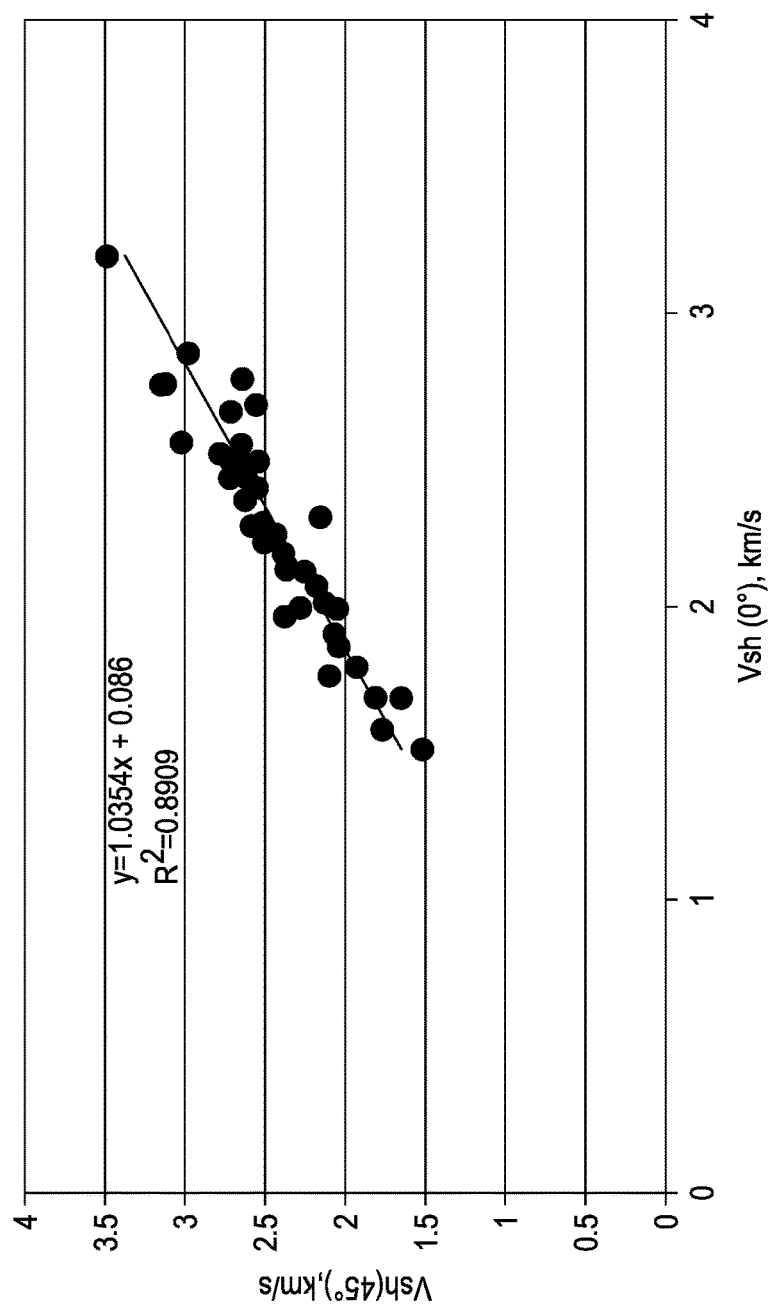
FIG. 6 is measured core data of the sonic wave velocity at 45° vs. velocity at 0° for s-waves with horizontal polarization (i.e., $V_{sh}(45°)$ vs $V_{sh}(0°)$) available in the literature from eight different shales across the world.

However, near-linear correlations between wave velocities at different angles have been observed. FIGS. 4-6 are ultra-sonic core data of the sonic wave velocity at 45° vs. velocity at 0° for p-waves (i.e., $V_p(45°)$ vs $V_p(0°)$), s-waves with vertical polarization (i.e., $V_{sv}(45°)$ vs $V_{sv}(0°)$), and s-waves with horizontal polarization (i.e., $V_{sh}(45°)$ vs $V_{sh}(0°)$), respectively. The plotted data is data compiled from literature sources from eight different shales across the world. Good and consistent linear relationships are observed between the velocities at 45° and 0°, which are independent of the shale type. Therefore, the wave velocity at 45° may be derived from the log measured wave velocity at 0° by using the linear correlations provided in Equation (6) where A and B are the regression coefficients obtained from core data fitting using the least squares optimization, and the subscript i denotes the acoustic wave mode: p, sv and sh. Here, $V_s(0°)=V_{sh}(0°)=V_{sv}(0°)$.

$$V_i(45°)=A_iV_i(0°)+B_i \quad \text{Equation (6)}$$

In some instances, the prediction of the 45° velocity may be further improved by including both the 0° p- and s-waves velocity in a linear correlation, which is provided in Equation (7) where A', B' and C' are the regression coefficients, and the subscript i follows the same definition as above.

$$V_i(45°)=A'_iV_s(0°)+B'_iV_p(0°)+C'_i \quad \text{Equation (7)}$$

Figure 7A:
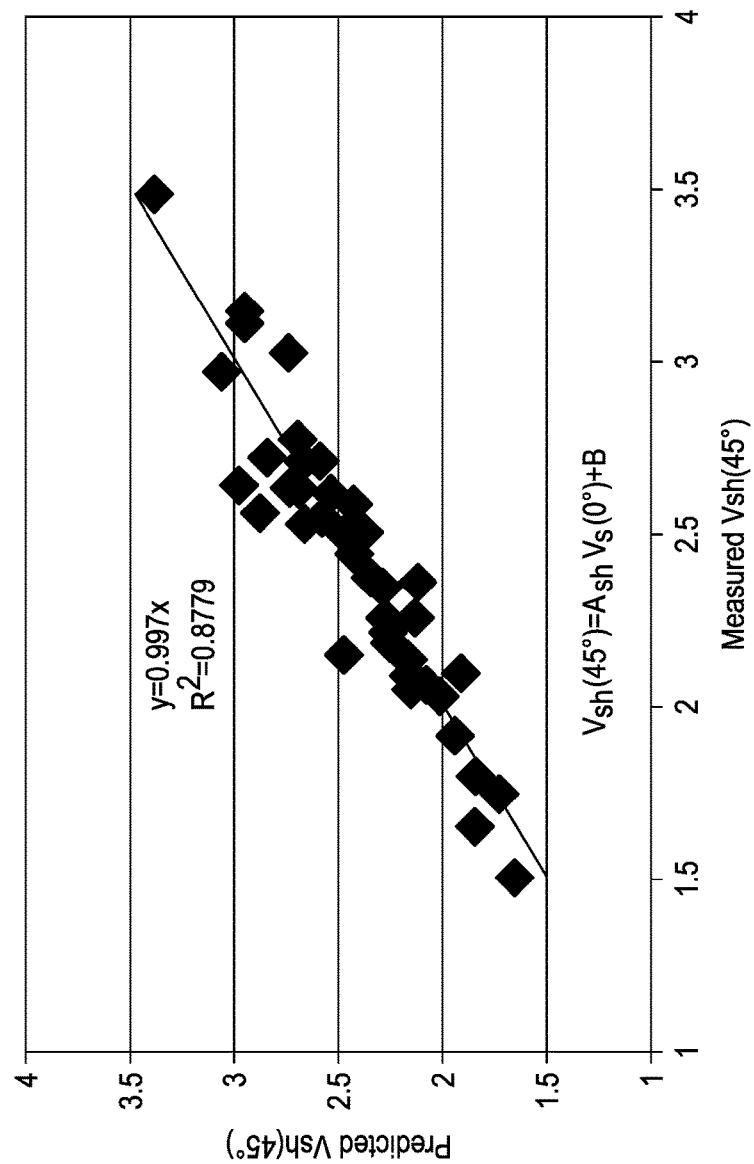
FIG. 7A provides $V_{sh}(45°)$ predicted by the Equation (6) vs. measured $V_{sh}(45°)$.
Figure 7B:
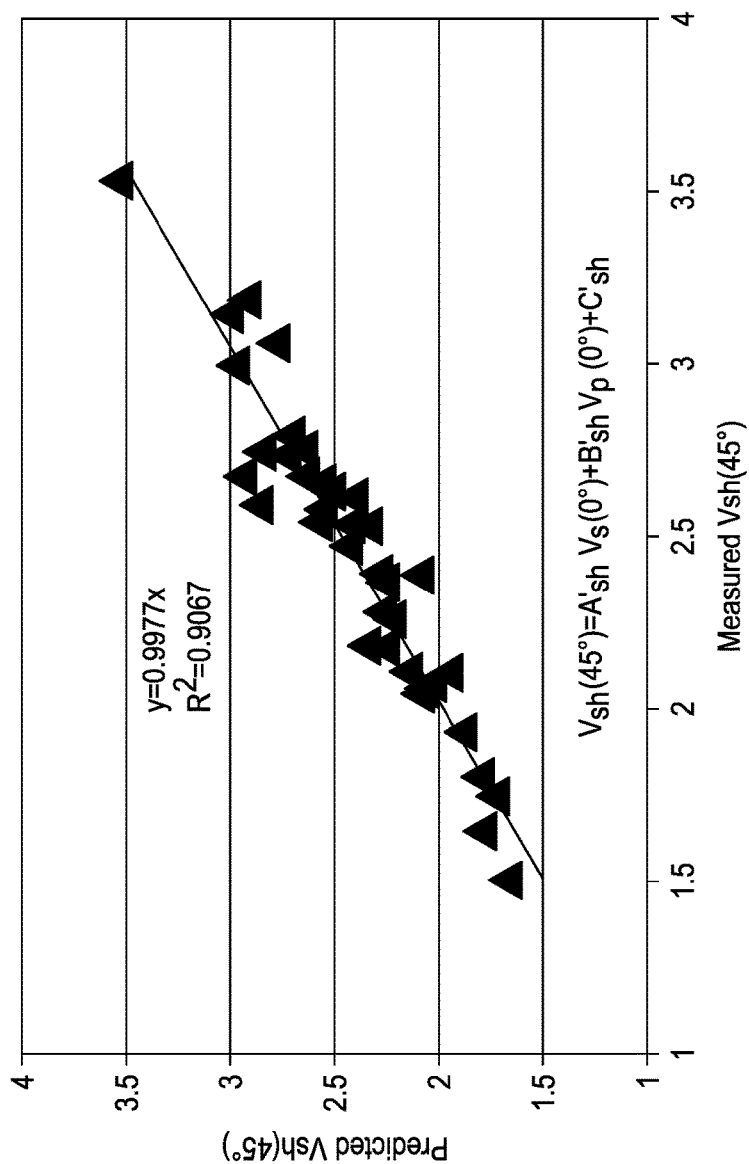
FIG. 7B provides $V_{sh}(45°)$ predicted by the Equation (7) vs. measured $V_{sh}(45°)$.

FIGS. 7A and 7B compare the results of $V_{sh}(45°)$ predicted by Equations (6) and (7), respectively, to measured $V_{sh}(45°)$, which illustrates that the scatter is improved by using Equation (7) instead of Equation (6). Further, the prediction of 45° velocity may, in some instances, be improved by running the stepwise regression (SWR) to get a linear correlation between 45° velocity and the 0°/90° velocities along with other inputs if available (e.g., rock density, kerogen volume fraction ($V_{kerogen}$), clay volume fraction ($V_{clay}$) or shale volume fraction ($V_{sh}$), and the like).

The wave velocities can be expressed in terms of the stiffness coefficients as illustrated in Equations (8)-(10) where θ is the angle between the unique axis (vertical axis for VTI) and the propagation direction of wave, and D is defined by the stiffness coefficients in Equation (11).

$$V_p^2(\theta) = \frac{1}{2\rho}[C_{33} + C_{44} + (C_{11} - C_{33})\sin^2\theta + D] \quad \text{Equation (8)}$$

$$V_{sv}^2(\theta) = \frac{1}{2\rho}[C_{33} + C_{44} + (C_{11} - C_{33})\sin^2\theta - D] \quad \text{Equation (9)}$$

$$V_{sh}^2(\theta) = \frac{1}{\rho}[C_{44}\cos^2\theta + C_{66}\sin^2\theta] \quad \text{Equation (10)}$$

$$D = \left\{ \begin{array}{c} (C_{33} - C_{44})^2 + 2[2(C_{13} + C_{44})^2 - (C_{33} - C_{44}) \\ (C_{11} + C_{33} - 2C_{44})]\sin^2\theta + \\ [(C_{11} + C_{33} - 2C_{44})^2 - 4(C_{13} + C_{44})^2]\sin^4\theta \end{array} \right\}^{1/2} \quad \text{Equation (11)}$$

Because the wave velocities at 45° are observed to have good linear relationships with the velocities at 0° ($R^2 > 0.9$), they can be predicted by substituting measured 0° velocities into the Equation (6) or (7). Equations (8)-(10) can be solved based on the calculated velocities at 45° to get Equations (12)-(14).

$$D = \mu V_p^2(45°) - \rho V_{sv}^2(45°) \quad \text{Equation (12)}$$

$$C_{11} = 2\rho V_p^2(45°) + 2\rho V_{sv}^2(45°) - C_{33} - 2C_{44} \quad \text{Equation (13)}$$

$$C_{66} = 2\rho V_{sh}^2(45°) - C_{44} \quad \text{Equation (14)}$$

Further, substituting θ=45° and solved $C_{11}$ and D in Equation (11), $C_{13}$ can be derived to Equation (15).

$$C_{13} = \sqrt{D^2 - 0.25(C_{33} - C_{11})^2} - C_{44} \quad \text{Equation (15)}$$

In the Equations (12)-(15), ρ is the rock density, and $C_{33}$ and $C_{44}$ can be determined by Equations (16) and (17), respectively. Finally, $C_{12}$ is obtained by VTI medium symmetry according to Equation (18).

$$C_{33} = \rho V_p^2(0°) \quad \text{Equation (16)}$$

$$C_{44} = \mu V_{sv}^2(0°) \quad \text{Equation (17)}$$

$$C_{12} = C_{11} - 2C_{66} \quad \text{Equation (18)}$$

Based on the modified ANNIE model, $C_{66}$ and $C_{11}$ can also be correlated as Equation (19). $C_{13}$ and $C_{12}$ follow a linear correlation of Equation (20). $K_1$ and $K_2$ are empirical constants derived from core data.

$$C_{11} = K_1(2(C_{66} - C_{44}) + C_{33}) \quad \text{Equation (19)}$$

$$C_{13} = K_2 C_{12} \quad \text{Equation (20)}$$

Additionally, $C_{13}$ may be better predicted by further including $V_{clay}$ or shale volume fraction ($V_{shale}$) (predicted from gamma ray measurements) and $V_{kerogen}$ (predicted from Halliburton's Fluids and Minerals Evaluation (FAME)™ probabilistic multi-mineral log analysis solver) in the linear correlation and etc. By combining the velocity regression method (V-reg) with the modified ANNIE (M-ANNIE) model to arrive at the combination model of the present disclosure, the stiffness coefficient $C_{66}$ originally from Stoneley wave in the modified ANNIE model can be obtained from velocity regression.

Figure 8:
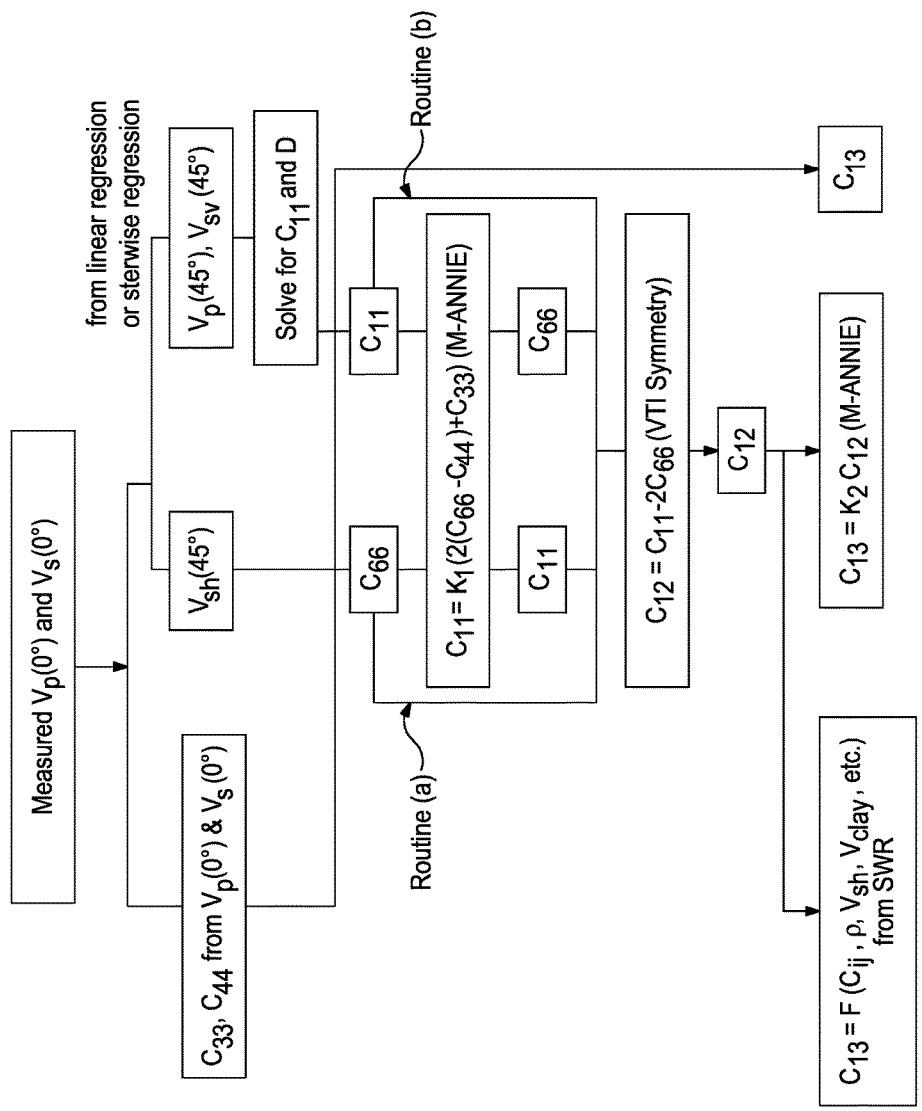
FIG. 8 provides an exemplary workflow for the combination model of the present disclosure where the well and the transverse isotropic axis of a surrounding formation are parallel or substantially parallel (e.g., a vertical well in a VTI medium or a horizontal well in a horizontal transverse isotropic (HTI) medium).

FIG. 8 provides an exemplary workflow for the combination model of the present disclosure where the well and the transverse isotropic axis of a surrounding formation are parallel or substantially parallel (i.e., within 10° of parallel) (e.g., a vertical well in a VTI medium or a horizontal well in a horizontal transverse isotropic (HTI) medium). As illustrated, the workflow is divided into four major steps.

The first step is to calculate $C_{33}$ and $C_{44}$ from measured 0° p- and s-wave velocities. The 0° p- and s-wave velocities may be also derived from the synthetic sonic data computed from porosity and mineralogy data obtained from logging data. In the same step, the wave velocities at 45° are also derived from the wave velocities at 0° based on their lab-data-defined linear correlations. The parameter D and the stiffness coefficients $C_{11}$ and $C_{66}$ are solved by substituting 45° velocity into the Equations (12)-(14).

In the second step, there are three sub-routines (a) $C_{66}$ from velocity regression is used to obtain $C_{11}$ based on the M-ANNIE assumption of Equation (19) (illustrated as routine (a)), (b) $C_{11}$ from velocity regression is used to obtain $C_{66}$ based on the same M-ANNIE assumption (illustrated as routine (b)) and (c) $C_{66}$ and $C_{11}$ are both from velocity regression. After the second step is done, we have the outputs of three groups of $C_{66}$ and $C_{11}$.

In the third step, the VTI symmetry assumption of Equation (18) is used to obtain $C_{12}$ from the $C_{66}$ and $C_{11}$ calculated in the previous step. Based on the different routines chosen in step 2, different $C_{12}$ can be obtained.

In the last step, there are three ways to calculate $C_{13}$. The first way is to directly calculate it from velocity regression by using Equation (15). The second way is using the linear correlations between $C_{13}$ and $C_{12}$, which is based on the ANNIE model or the modified ANNIE model assumptions. The linear multiplier $K_2$ is originally 1 and can be further specified from core data calibration for certain reservoirs. The third way is to predict $C_{13}$ using a linear function of known $C_{ij}$, rock density, $V_{sh}$ or $V_{clay}$, $V_{kerogen}$, and the like. The rock density, $V_{clay}$ or $V_{sh}$, and $V_{kerogen}$ may be derived from log data such as nuclear log data, magnetic resonance log data, resistivity log data, geochem log data, or a combination thereof. All listed parameters may have more or less influences on $C_{13}$. The SWR is conducted based on core data to decide which variables to include in the model and the final form of the model based on the selected variables. Taking the advantage of SWR technique, the third method is more general with less bias than the ANNIE and modified ANNIE models when predicting $C_{13}$.

Figure 9:
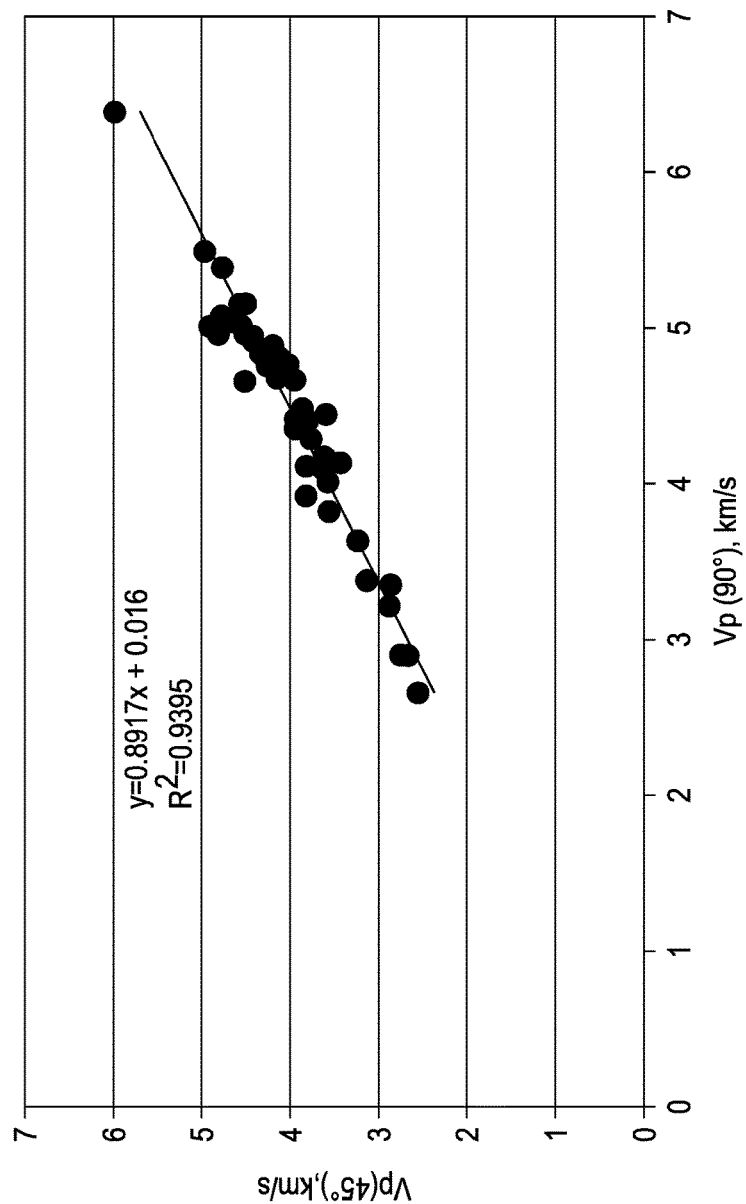
FIG. 9 provides correlated dynamic core data for the p-wave velocity at 90° and 45°.
Figure 10:
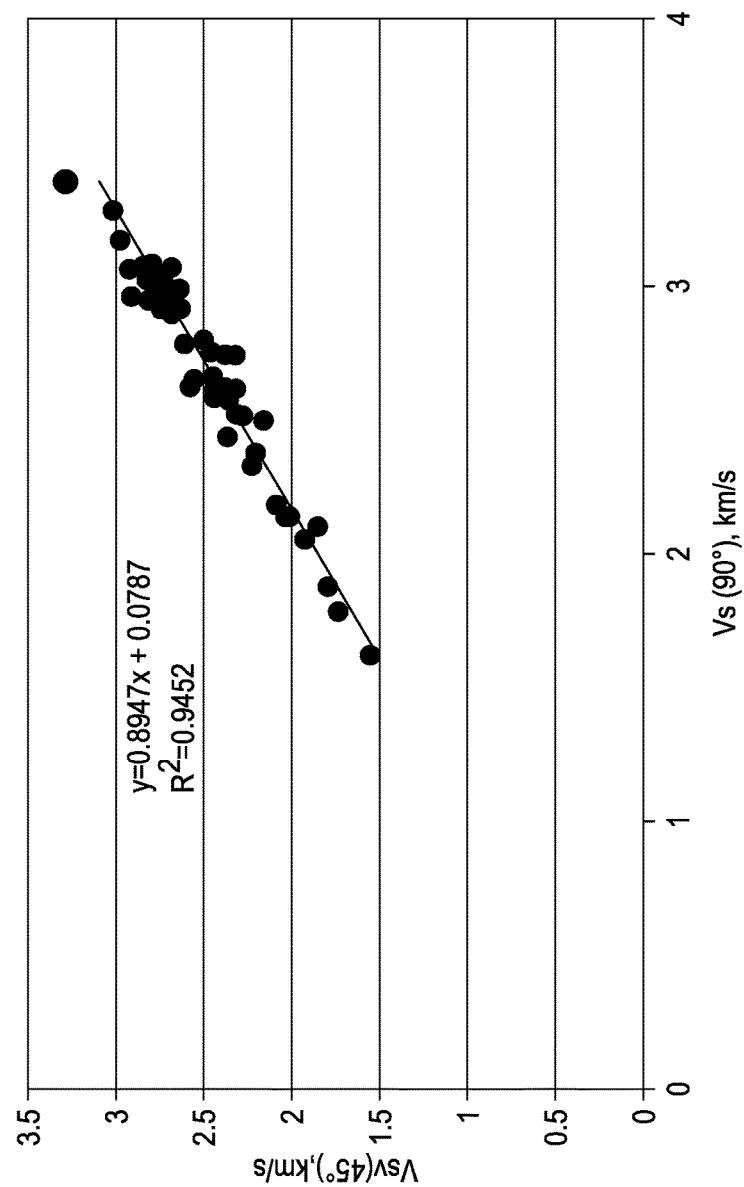
FIG. 10 provides correlated dynamic core data of the s-wave velocity at 90° and 45° with vertical polarization.

In a horizontal well, the wave velocity at 90° is measured. Similarly, good linear relationships are found between the velocities of waves propagating at 45° and 90° (shown in FIGS. 9 and 10).

Therefore, the wave velocity at 45° can be derived from the log measured wave velocity at 90° by using the linear correlations generated from the lab data. Based on the measured 90° velocity, $C_{11}$, $C_{44}$, and $C_{66}$ can be directly obtained. The 45° velocity from regression can be substituted in Equations (12) and (13) to predict D and $C_{33}$, respectively. After obtaining D and $C_{33}$, $C_{13}$ is predicted by Equation (15). In addition to using regression velocity, the modified ANNIE assumptions can also be used to obtain $C_{33}$ and $C_{13}$. The answers from the two different routines can be validated or verified by each other.

Figure 11:
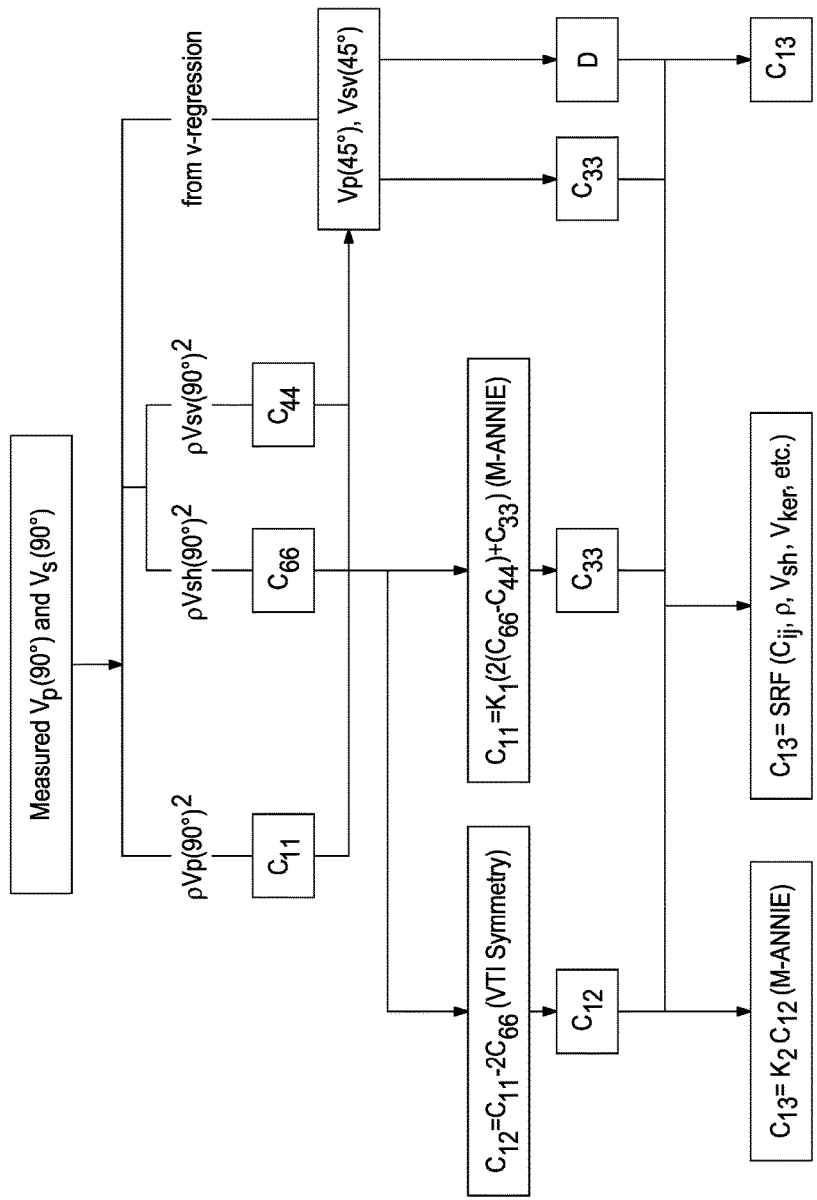
FIG. 11 provides an exemplary workflow for the combination model of the present disclosure where the well and the transverse isotropic axis of a surrounding formation are perpendicular or substantially perpendicular (e.g., a vertical well in an HTI medium or a horizontal well in a VTI medium).

FIG. 11 provides an exemplary workflow for the combination model of the present disclosure where the well and the transverse isotropic axis of a surrounding formation are perpendicular or substantially perpendicular (i.e., within 10° of perpendicular) (e.g., a vertical well in an HTI medium or a horizontal well in a VTI medium). After obtaining sonic logging data that $V_p(90°)$, $V_{sv}(90°)$, and $V_{sh}(90°)$ for a well extending perpendicular or substantially perpendicular to a transverse isotropic axis of a surrounding formation, $C_{11}$, $C_{66}$, and $C_{44}$ are first calculated based on measured 90° velocities by Equations (21), (22), and (23), respectively.

$$C_{11} = \rho V_p^2(90°) \quad \text{Equation (21)}$$

$$C_{66} = \rho V_{sh}^2(90°) \quad \text{Equation (22)}$$

$$C_{44} = \rho V_{sv}^2(90°) \quad \text{Equation (23)}$$

Then, the correlations between $V_p(45°)$ and $V_p(90°)$, $V_{sv}(45°)$ and $V_{sv}(90°)$, and $V_{sh}(45°)$ and $V_{sh}(90°)$ may be derived each according to either Equation (24) and/or Equation (25) where E and F are Equation (6) regression coefficients, E', F', G' and H' are Equation (7) regression coefficients, and i is p or sv for their respective correlations.

$$V_i(45°) = E_i V_i(90°) + F_i \quad \text{Equation (24)}$$

$$V_i(45°) = E'_i V_{sv}(90°) + F'_i V_{sh}(90°) + G'_i V_p(90°) + H'_i \quad \text{Equation (25)}$$

The foregoing correlations may be used to calculate $V_p(45°)$ and $V_{sv}(45°)$. Then, using Equation (12) above, the parameter D may be calculated. Then, $C_{12}$ is calculated based on the VTI symmetry constrain Equation (18), and either (1) the modified ANNIE assumption from Equation (19) or (2) regression wave velocities at 45° from Equation (13) are used to calculate $C_{33}$.

The calculated $C_{33}$ can be further used in conjunction with regression velocities to predict $C_{13}$ according to Equation (15). A parallel way is to use the relationship between $C_{12}$ and $C_{13}$ to calculate $C_{13}$ based on predicted $C_{12}$. Better prediction of $C_{13}$ can be achieved by running stepwise regression with additional information about mineralogy and fabric of the shale rocks (e.g., rock density, $V_{kerogen}$, $V_{clay}$ or $V_{sh}$, and the like).

After calculating predicted values for the stiffness coefficients by either combination model described herein (i.e., FIG. 8 or FIG. 11), the elastic moduli of the formation may be determined by Equations (2)-(5). Then, the minimum horizontal stress of the formation may be calculated by Equation (26), where $\sigma_v$ is the overburden stress gradient (psi/ft), $\alpha$ is Biot's elastic constant, is a poroelastic constant, $p_p$ is a pore pressure gradient, $\epsilon H_{max}$ is the maximum horizontal strain, and $\epsilon H_{min}$ is the minimum horizontal strain.

$$\sigma_{Hmin} = \frac{E_h}{E_v} \frac{v_v}{1-v_h} [\sigma_v - \alpha(1-\xi)p_p] + \quad \text{Equation (26)}$$

$$\alpha p_p + \frac{E_h}{1-v_h^2} \epsilon H_{min} + \frac{E_h v_h}{1-v_h^2} \epsilon H_{max}$$

Then, a closure fracture pressure gradient is determined based on the minimum horizontal stress. For example, closure fracture pressure may be equal to or related to the minimum horizontal stress. Well completion steps such as frac or perforation operations may then be determined based on the closure fracture pressure gradient. More specifically, the location and/or spacing of perforations may be selected based on the determined closure fracture pressure gradient.

FIGS. 12-20 are further discussed in examples provided below.

Figure 21:
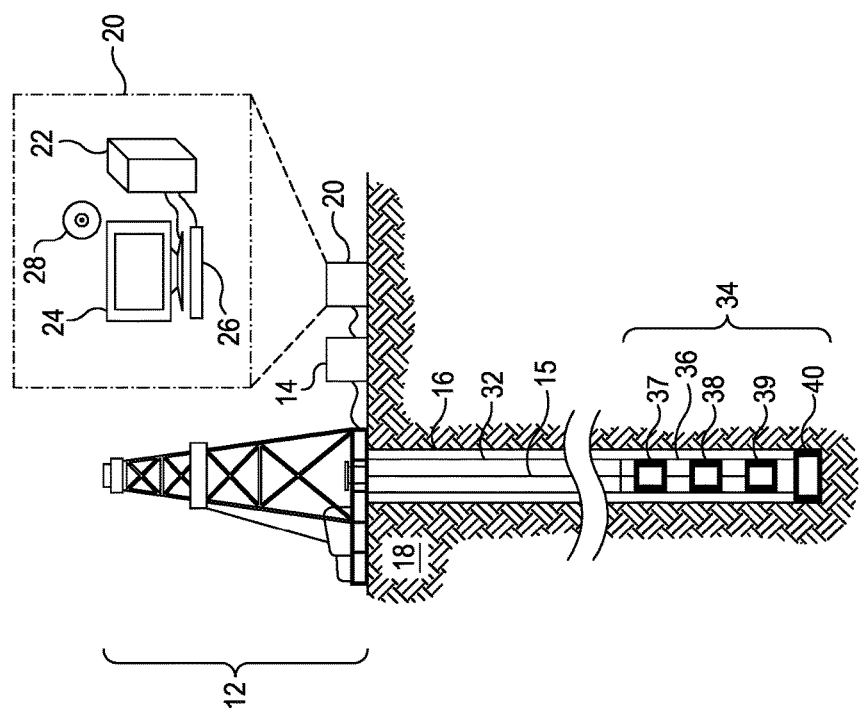
FIG. 21 illustrates a system suitable for use in executing the methods and applying the combination model described herein.

FIG. 21 illustrates a system suitable for use in executing the methods and applying the combination model described herein. As illustrated, a drilling assembly 12 enables a drill string 32 to be lowered and raised in a borehole 16 that penetrates a formation 18. In at least some embodiments, the formation 18 is determined or 15 modeled to be transversely isotropic with a vertical axis of symmetry (TIV) (the z direction is parallel to the vertical axis in FIG. 3).

At the lower end of the drill string 32, a bottomhole assembly 34 with a drill bit 40 removes material from the formation 18 using known drilling techniques. The bottomhole assembly 34 also includes a logging tool 36 that collects, for example, sonic log data as described herein. The logging tool 36 includes transmitter(s) 39, receiver(s) 38, and a communication interface 37. The transmitter(s) 39 and receiver(s) 38 enable collection of sonic logging data, which may be conveyed to earth's surface via a wired or wireless communication interface 15. The communication interface 15 also may enable downhole communications (e.g., logging instructions or control parameters) from earth's surface to the logging tool 36. Example sonic log data that may be collected includes propagation velocities of compressional and shear waves, sonic waveforms, and derivable values such as acoustic impedance.

At earth's surface, a surface interface 14 receives the collected log data and conveys the collected log data to a computer system 20. In some embodiments, the surface interface 14 and/or the computer system 20 may perform various operations such as formatting, storing and/or processing the data. Further, the computer system 20 performs stiffness analysis based in part on the collected log data and the modified ANNIE model described herein. For example, in at least some embodiments, the computer system 20 includes a processing unit 22 that performs the disclosed stiffness analysis operations by executing software or instructions obtained from a local or remote non-5 transitory computer-readable medium 28. The computer system 20 also may include input device(s) 26 (e.g., a keyboard, mouse, touchpad, etc.) and output device(s) 24 (e.g., a monitor, printer, etc.). Such input device(s) 26 and/or output device(s) 24 provide a user interface that enables an operator to interact with the logging tool 36 and/or software executed by the processing unit 22. For example, the computer system 20 may enable an operator to select stiffness analysis options, to view collected logged data, to view stiffness analysis results, and/or to perform other tasks.

At various times during the drilling process, the drill string 32 shown in FIG. 21 may be removed from the borehole 16. With the drill string 32 removed, wireline logging operations may be performed with wireline logging survey equipment.

Embodiments described herein include, but are not limited to, Embodiments A-D.

Embodiment A is a method comprising: obtaining sonic logging data that includes 0° p-wave velocities ($V_p(0°)$) and 0° s-wave velocities ($V_s(0°)$) for a well extending parallel or substantially parallel to a transverse isotropic axis of a surrounding formation, wherein the $V_s(0°)$ is 0° s-wave velocity with vertical polarization ($V_{sv}(0°)$) or 0° s-wave velocity with horizontal polarization ($V_{sh}(0°)$) because $V_s(0°) = V_{sv}(0°) = V_{sh}(0°)$; deriving one selected from the group consisting of: a first correlation between 45° p-wave velocities ($V_p(45°)$) and the $V_p(0°)$, a second correlation between 45° s-wave velocities with vertical polarization ($V_{sv}(45°)$) and the $V_{sv}(0°)$, a third correlation between 45° s-wave velocities with horizontal polarization ($V_{sh}(45°)$) and the $V_{sh}(0°)$, and any combination thereof; calculating $C_{33}$ and $C_{44}$ stiffness coefficients based on the $V_p(0°)$ and the $V_{sv}(0°)$, respectively; calculating $C_{11}$ and $C_{66}$ stiffness coefficients based on one selected from the group consisting of: the first correlation, the second correlation, the third correlation, and any combination thereof; calculating a $C_{12}$ stiffness coefficient based on the $C_{11}$ and $C_{66}$ stiffness coefficients; calculating a $C_{13}$ stiffness coefficient based on one selected from the group consisting of: (A) the $C_{11}$, $C_{33}$, and $C_{44}$ stiffness coefficients, (B) an ANNIE model, (C) a modified ANNIE model, (D) a stepwise regression based on selected core data, and (E) any combination thereof; and characterizing the surrounding formation corresponding to the sonic logging data based on the $C_{33}$, $C_{44}$, $C_{66}$, $C_{11}$, $C_{12}$, and $C_{13}$ stiffness coefficients.

Embodiment B is a system comprising: a processing unit; and a memory coupled to the processing unit, wherein the memory stores software that, when executed, causes the processing unit to perform the method of Embodiments A (e.g., obtain sonic logging data that includes 0° p-wave velocities ($V_p(0°)$) and 0° s-wave velocities ($V_s(0°)$) for a well extending parallel or substantially parallel to a transverse isotropic axis of a surrounding formation, wherein the $V_s(0°)$ is 0° s-wave velocities with vertical polarization ($V_{sv}(0°)$) or 0° s-wave velocities with horizontal polarization ($V_{sh}(0°)$) because $V_s(0°)=V_{sv}(0°)=V_{sh}(0°)$; derive one selected from the group consisting of: a first correlation between 45° p-wave velocities ($V_p(45°)$) and the $V_p(0°)$, a second correlation between 45° s-wave velocities with vertical polarization ($V_{sv}(45°)$) and the $V_{sv}(0°)$, a third correlation between 45° s-wave velocities with horizontal polarization ($V_{sh}(45°)$) and the $V_{sh}(0°)$, and any combination thereof; calculate $C_{33}$ and $C_{44}$ stiffness coefficients based on the $V_p(0°)$ and the $V_{sv}(0°)$, respectively; calculate $C_{11}$ and $C_{66}$ stiffness coefficients based on one selected from the group consisting of: the first correlation, the second correlation, the third correlation, and any combination thereof; calculate a $C_{12}$ stiffness coefficient based on the $C_{11}$ and $C_{66}$ stiffness coefficients; calculate a $C_{13}$ stiffness coefficient based on one selected from the group consisting of: (A) the $C_{11}$, $C_{33}$, and $C_{44}$ stiffness coefficients, (B) an ANNIE model, (C) a modified ANNIE model, (D) a stepwise regression based on selected core data, and (E) any combination thereof; and characterize the surrounding formation corresponding to the sonic logging data based on the $C_{33}$, $C_{44}$, $C_{66}$, $C_{11}$, $C_{12}$, and $C_{13}$ stiffness coefficients) and optionally including any optional elements described further herein.

Embodiments A and B may optionally further include at least one of the following: Element 1: wherein calculating the $C_{33}$, $C_{44}$, $C_{66}$, $C_{11}$, $C_{12}$, and $C_{13}$ stiffness coefficients does not use Stoneley wave velocity data; Element 2: wherein deriving one or more of the first, second, or third correlations is based on) $V_i(45°)=A_i V_i(0°)+B_i$ where A and B are regression coefficients and i is p, sv, or sh for the first, second, or third correlations, respectively; Element 3: wherein deriving one or more of the first, second, or third correlations is based on $V_i(45°)=A'_i V_s(0°)+B'_i V_p(0°)+C'_i$ where A', B' and C' are regression coefficients and i is p, sv, or sh for the first, second, or third correlations, respectively; Element 4: wherein calculating the $C_{33}$ and $C_{44}$ stiffness coefficients is based on $C_{33}=\rho V_p^2(0°)$ and $C_{44}=\rho V_{sv}^2(0°)$, where $\rho$ is a rock density; Element 5: wherein calculating the $C_{11}$ and $C_{66}$ stiffness coefficients is based on one selected from the group consisting of: (A) $C_{11}=2\rho V_p^2(45°)+2\rho V_{sv}^2(45°)-C_{33}-2C_{44}$ and $C_{11}=2\rho V_p^2(45°)+2\rho V_{sv}^2(45°)-C_{33}-2C_{44}$; (B) $C_{11}=2\rho V_p^2(45°)+2\rho V_{sv}^2(45°)-C_{33}-2C_{44}$ and $C_{11}=K_1(2(C_{66}-C_{44})+C_{33})$; and (C) $C_{11}=2\rho V_p^2(45°)+2\rho V_{sv}^2(45°)-C_{33}-2C_{44}$ and $C_{11}=K_1(2(C_{66}-C_{44})+C_{33})$, where $K_1$ is an empirical constant derived from core data and $\rho$ is a rock density; Element 6: wherein calculating the $C_{12}$ stiffness coefficient is based on $C_{12}=C_{11}-2C_{66}$; Element 7: wherein calculating the $C_{13}$ stiffness coefficient is based on the $C_{11}$, $C_{33}$, and $C_{44}$ stiffness coefficients using $D=\rho V_p^2(45°)-\rho V_{sv}^2(45°)$ and $$C_{13} = \sqrt{D^2 - 0.25(C_{33} - C_{11})^2} - C_{44},$$

where $\rho$ is a rock density; Element 8: wherein characterizing the surrounding formation involves calculating a horizontal Young's Modulus ($E_h$) according to $$E_h = \frac{(C_{11} - C_{12}) * (C_{11}C_{33} - 2C_{13}^2 + C_{12}C_{33})}{C_{11}C_{33} - C_{13}^2},$$

a horizontal Poisson's Ratio ($v_h$) according to $$v_h = \frac{C_{33}C_{12} + C_{13}^2}{C_{33}C_{11} - C_{13}^2},$$

a vertical Young's Modulus ($E_v$) according to $$E_v = C_{33} - \frac{2C_{13}^2}{C_{11} - C_{12}},$$

and a vertical Poisson's Ratio ($v_v$) according to $$v_v = \frac{C_{13}}{C_{11} + C_{12}};$$

Element 9: Element 8 and the method further comprising calculating a minimum horizontal stress ($\sigma_{Hmin}$) of the formation by $$\sigma_{Hmin} = \frac{E_h}{E_v}\frac{v_v}{1-v_h}[\sigma_v - \alpha(1-\xi)p_p] + \alpha p_p + \frac{E_h}{1-v_h^2}\epsilon H_{min} + \frac{E_h v_h}{1-v_h^2}\epsilon H_{max},$$

where $\sigma_v$ is the overburden stress gradient (psi/ft), $\alpha$ is Biot's elastic constant, $\xi$ is a poroelastic constant, $p_p$ is a pore pressure gradient, $\epsilon H_{max}$ is a maximum horizontal strain, and $\epsilon H_{min}$ is a minimum horizontal strain; Element 10: Element 9 and the method further comprising determining a closure fracture pressure gradient is determined based on the minimum horizontal stress; Element 11: Element 10 and the method further comprising controlling a well completion operation based on the closure fracture pressure gradient; Element 12: wherein characterizing the surrounding formation involves performing a stage/perforation design based on the $C_{33}$, $C_{44}$, $C_{66}$, $C_{11}$, $C_{12}$, and $C_{13}$ stiffness coefficients; Element 13: Element 12 and wherein the stage/perforation design produces perforation parameters and the method further comprises perforating a vertical well penetrating the surrounding formation based on the perforation parameters; Element 14: wherein characterizing the surrounding formation involves performing a hydraulic fracturing model based on the $C_{33}$, $C_{44}$, $C_{66}$, $C_{11}$, $C_{12}$, and $C_{13}$ stiffness coefficients; Element 15: Element 14 and wherein the hydraulic fracturing model produces fracturing parameters and the method further comprises performing a fracturing operation based on the fracturing parameters; Element 16: wherein characterizing the surrounding formation involves performing a stage/perforation design and a hydraulic fracturing model based on the $C_{33}$, $C_{44}$, $C_{66}$, $C_{11}$, $C_{12}$, and $C_{13}$ stiffness coefficients to produce perforation and fracturing parameters, and wherein the method further comprises perforating the vertical well and performing a fracturing operation based on the perforation and fracturing parameters; Element 17: wherein obtaining sonic logging data involves measuring sonic logging data; and Element 18: wherein obtaining sonic logging data involves computing synthetic sonic data from porosity and minerology data obtained from logging data. Exemplary combinations may include, but are not limited to, two or more of Elements 1-7 in combination; one or more of Elements 2-7 in combination with one or more of Elements 8-18; one or more of Elements 2-7 in combination with Element 1 and optionally one or more of Elements 8-18; and Element 1 in combination with one or more of Elements 8-18.

Embodiment C is a method comprising: obtaining sonic logging data that includes 90° p-wave velocities ($V_p(90°)$), 90° s-wave velocities with vertical polarization ($V_{sv}(90°)$), and 90° s-wave velocities with horizontal polarization)) ($V_{sh}(90°)$) a well extending perpendicular or substantially perpendicular to a transverse isotropic axis of a surrounding formation; calculating $C_{11}$, $C_{66}$, and $C_{44}$ stiffness coefficients based on the $V_p(90°)$, the $V_{sh}(90°)$, and the $V_{sv}(90°)$, respectively; deriving one selected from the group consisting of: a first correlation between 45° p-wave velocities ($V_p(45°)$) and the $V_p(90°)$, a second correlation between 45° s-wave velocities ($V_{sv}(45°)$) and the $V_{sv}(90°)$, and any combination thereof; calculating a $C_{33}$ stiffness coefficient based on one selected from the group consisting of: (A) the first and second correlations; (B) the $C_{11}$, $C_{66}$, and $C_{44}$ stiffness coefficients; and (C) a combination thereof; calculating a $C_{12}$ stiffness coefficient based on the $C_{11}$ and $C_{66}$ stiffness coefficients; calculating a $C_{13}$ stiffness coefficient based on one selected from the group consisting of: (A) the $C_{11}$, $C_{33}$, and $C_{44}$ stiffness coefficients, (B) an ANNIE model, (C) a modified ANNIE model, (D) a stepwise regression based on selected core data, and (E) any combination thereof; and characterizing the surrounding formation corresponding to the sonic logging data based on the $C_{33}$, $C_{44}$, $C_{66}$, $C_{11}$, $C_{12}$, and $C_{13}$ stiffness coefficients.

Embodiment D is a system comprising: a processing unit; and a memory coupled to the processing unit, wherein the memory stores software that, when executed, causes the processing unit to perform the method of Embodiments C (e.g., obtain sonic logging data that includes 90° p-wave velocities ($V_p(90°)$), 90° s-wave velocities with vertical polarization ($V_{sv}(90°)$), and 90° s-wave velocities with horizontal polarization ($V_{sh}(90°)$) a well extending perpendicular or substantially perpendicular to a transverse isotropic axis of a surrounding formation; calculate $C_{11}$, $C_{66}$, and $C_{44}$ stiffness coefficients based on the $V_p(90°)$, the $V_{sh}(90°)$, and the $V_{sv}(90°)$, respectively; derive one selected from the group consisting of: a first correlation between 45° p-wave velocities ($V_p(45°)$) and the $V_p(90°)$, a second correlation between 45° s-wave velocities ($V_{sv}(45°)$) and the $V_{sv}(90°)$, and any combination thereof; calculate a $C_{33}$ stiffness coefficient based on one selected from the group consisting of: (A) the first and second correlations; (B) the $C_{11}$, $C_{66}$, and $C_{44}$ stiffness coefficients; and (C) a combination thereof; calculate a $C_{12}$ stiffness coefficient based on the $C_{11}$ and $C_{66}$ stiffness coefficients; calculate a $C_{13}$ stiffness coefficient based on one selected from the group consisting of: (A) the $C_{11}$, $C_{33}$, and $C_{44}$ stiffness coefficients, (B) an ANNIE model, (C) a modified ANNIE model, (D) a stepwise regression based on selected core data, and (E) any combination thereof; and characterize the surrounding formation corresponding to the sonic logging data based on the $C_{33}$, $C_{44}$, $C_{66}$, $C_{11}$, $C_{12}$, and $C_{13}$ stiffness coefficients) and optionally including any optional elements described further herein.

Embodiments C and D may optionally further include at least one of the following: Element 1; Element 8; Element 9; Element 10; Element 11; Element 12; Element 13; Element 14; Element 15; Element 16; Element 17; Element 18; Element 20: wherein calculating the $C_{11}$, $C_{66}$, and $C_{44}$ stiffness coefficients is based on $C_{11}=\rho V_p^2(90°)$ $C_{66}=\rho V_{sh}^2(90°)$, and $C_{44}=\rho V_{sv}^2(90°)$, respectively, where $\rho$ is a rock density; Element 21: wherein deriving one or both of the first and second correlations is based on $V_i(45°)=E_i V_i(90°)+F_i$, where E and F are regression coefficients and i is p or sv for the first or second correlation, respectively; Element 22: wherein deriving one or both of the first and second correlations is based on $V_i(45°)=E'_i V_{sv}(90°)+F'_i V_{sh}(90°)+G'_i V_p(90°)+H'_i$, where E', F', G', and H' are regression coefficients and i is p or sv for the first or second correlation, respectively; Element 23: wherein calculating the $C_{33}$ stiffness coefficient based on the first and second correlations according to $C_{11}=2\rho V_p^2(45°)+2\rho V_{sv}^2(45°)-C_{33}-2C_{44}$, where $\rho$ is a rock density; Element 24: wherein calculating the $C_{33}$ stiffness coefficient based on the $C_{11}$, $C_{66}$, and $C_{44}$ stiffness coefficients according to $C_{11}=K_1(2(C_{66}-C_{44})+C_{33})$, where $K_1$ is an empirical constant derived from core data; Element 25: wherein calculating the $C_{12}$ stiffness coefficient based on $C_{12}=C_{11}-2C_{66}$; Element 26: wherein calculating the $C_{13}$ stiffness coefficient is based on the $C_{11}$, $C_{33}$, and $C_{44}$ stiffness coefficients using $D=\rho V_p^2(45°)-\rho V_{sv}^2(45°)$ and $$C_{13} = \sqrt{D^2 - 0.25(C_{33}-C_{11})^2} - C_{44},$$

where $\rho$ is a rock density. Exemplary combinations may include, but are not limited to, two or more of Elements 20-26 in combination; one or more of Elements 20-26 in combination with one or more of Elements 8-18; one or more of Elements 20-26 in combination with Element 1 and optionally one or more of Elements 8-18; and Element 1 in combination with one or more of Elements 8-18.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

Examples

Figure 12:
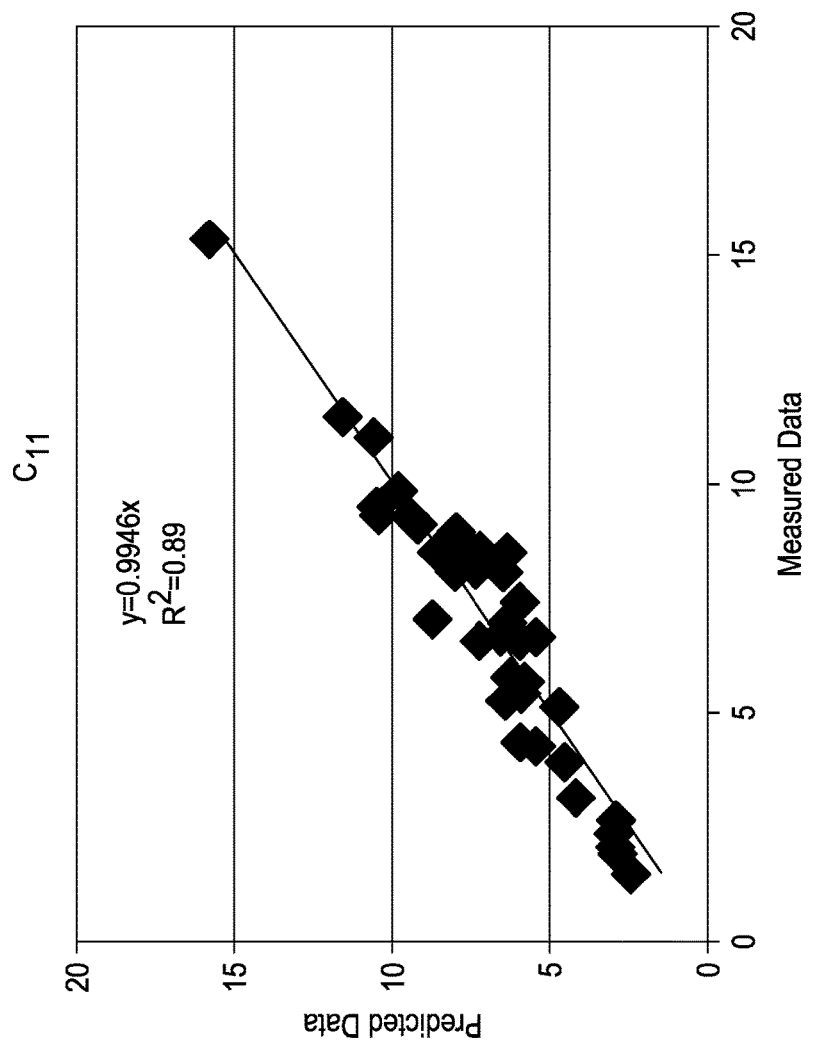
FIG. 12 compares the measured and predicted values for the stiffness coefficient $C_{11}$, where the predicted values are determined with the $V_p(45°)$ and $V_{sv}(45°)$ calculated by Equation (7).
Figure 13:
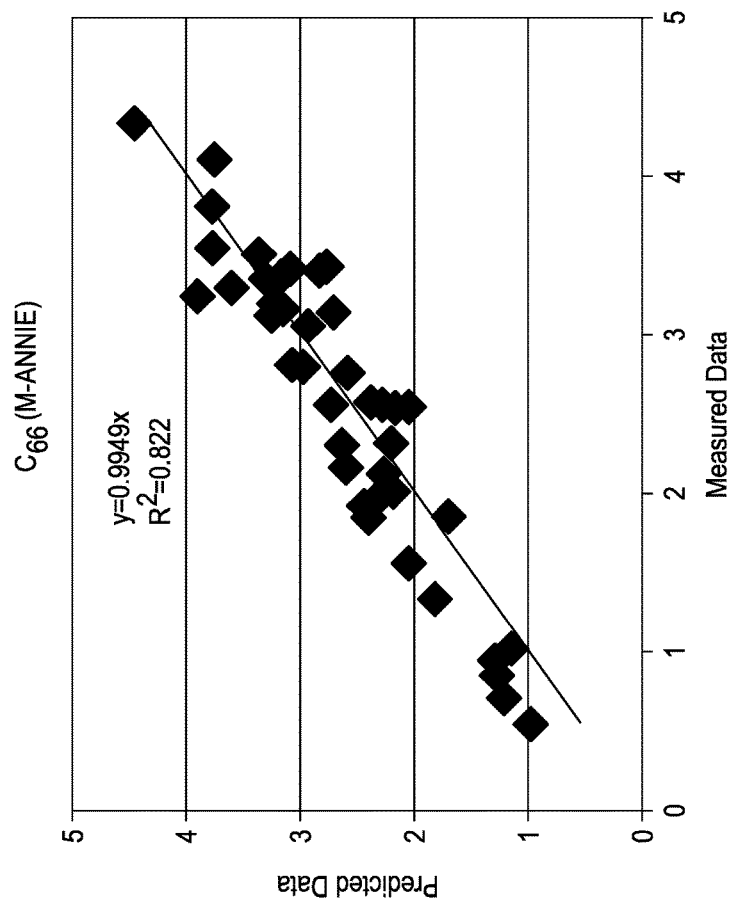
FIG. 13 compares the measured and predicted values for the stiffness coefficient $C_{66}$, where the predicted values are determined with the modified ANNIE model.
Figure 14:
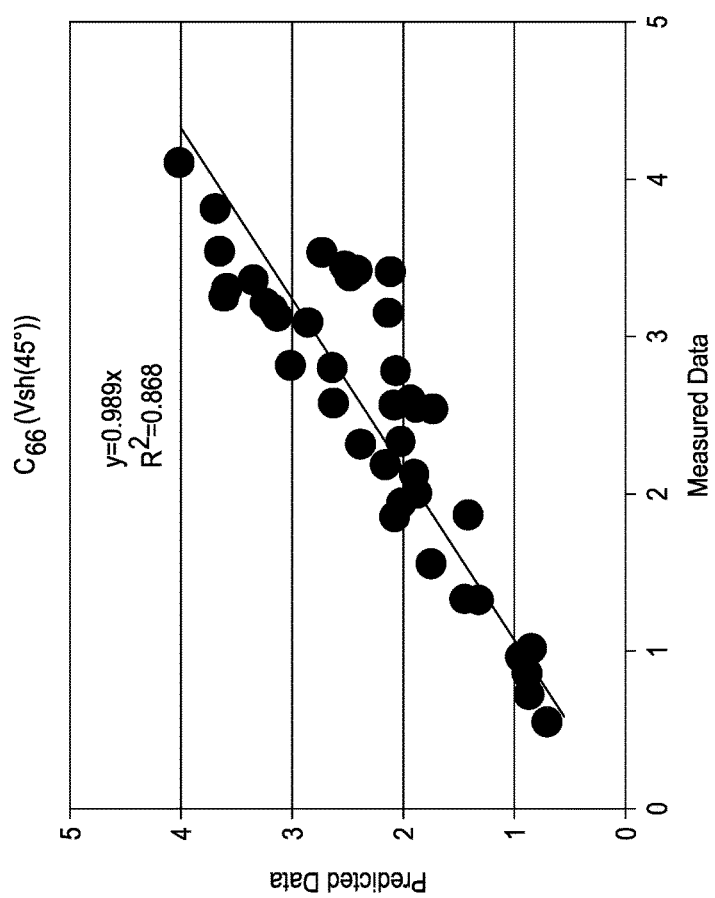
FIG. 14 compares the measured and predicted values for the stiffness coefficient $C_{66}$, where the predicted values are determined with the $V_{sh}(45°)$.
Figure 15:
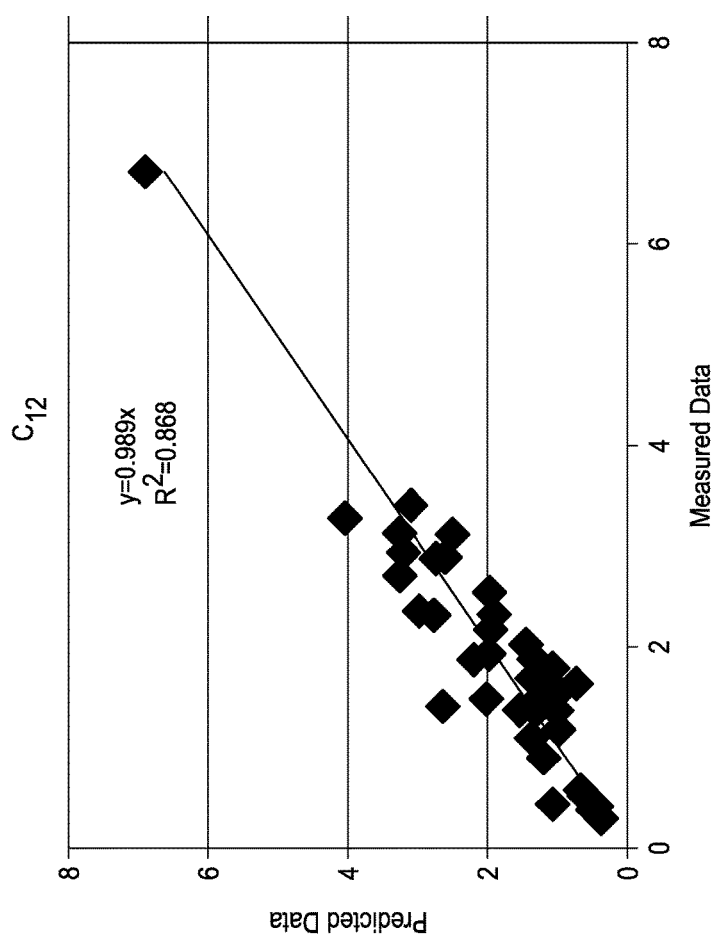
FIG. 15 compares the measured and predicted values for the stiffness coefficient $C_{12}$.
Figure 16:
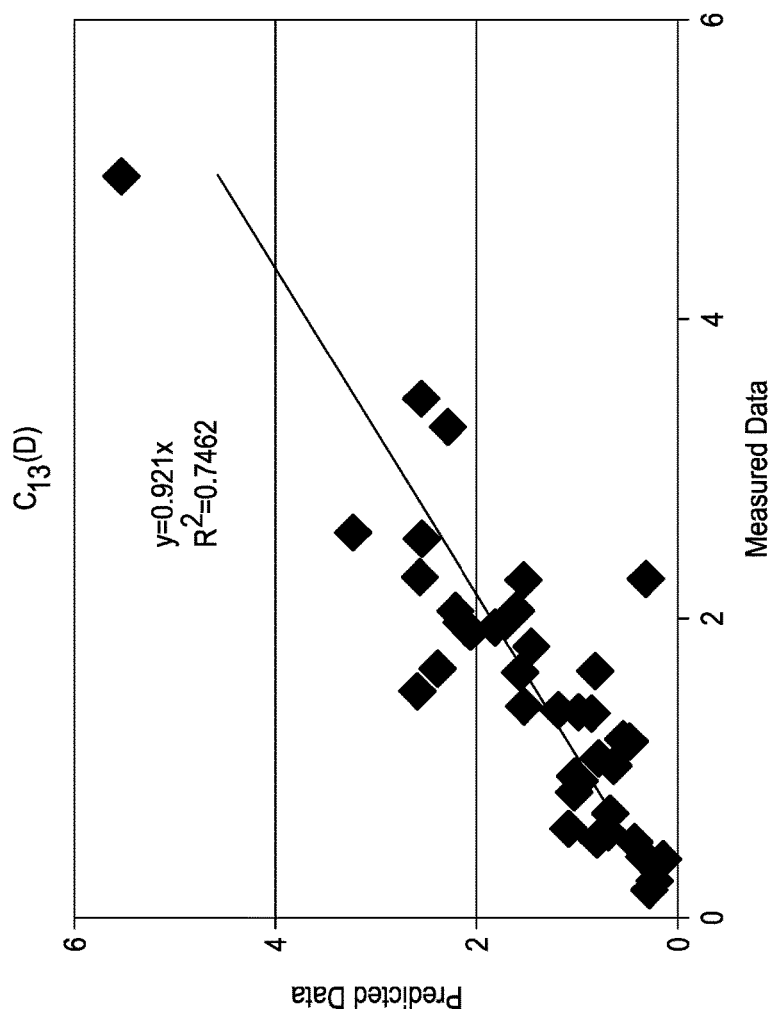
FIG. 16 compares the measured and predicted values for the stiffness coefficient $C_{13}$, where the predicted values are determined with the D.
Figure 17:
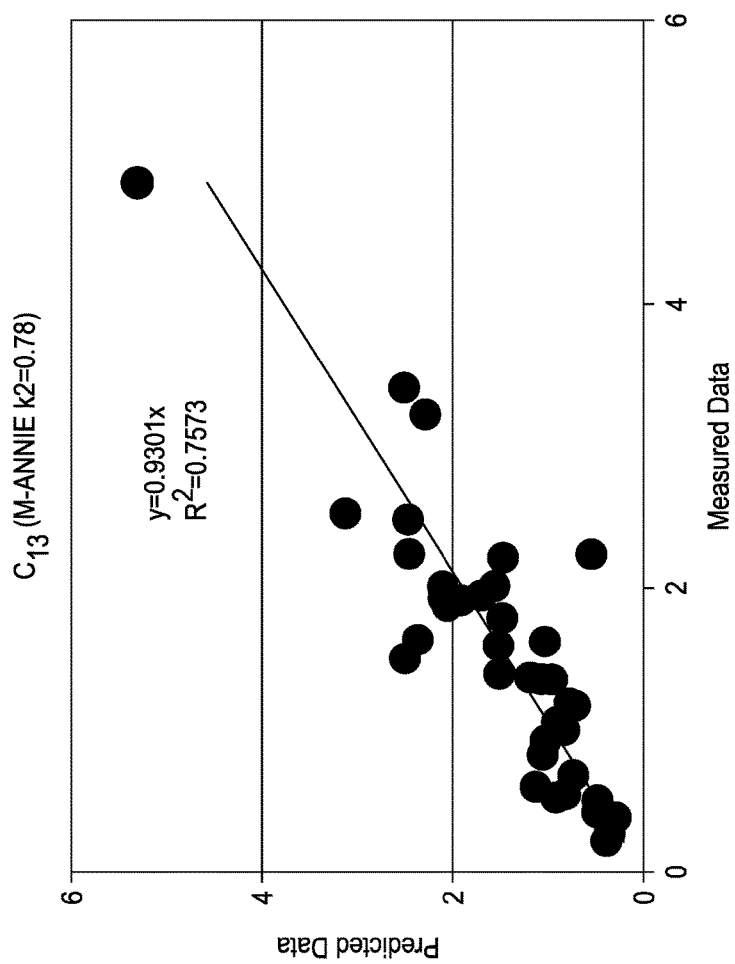
FIG. 17 compares the measured and predicted values for the stiffness coefficient $C_{13}$, where the predicted values are determined with the modified ANNIE model.
Figure 18:
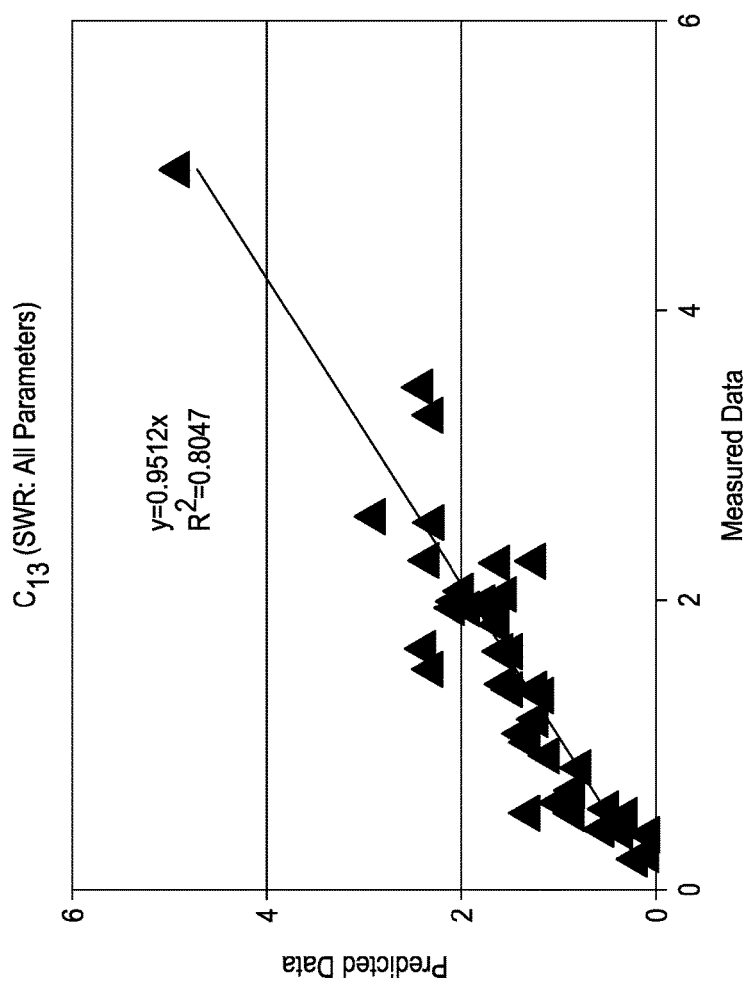
FIG. 18 compares the measured and predicted values for the stiffness coefficient $C_{13}$, where the predicted values are determined with the stepwise regression (SWR): all parameters.

The combination model described herein that combines the V-reg model with the M-ANNIE model described herein was applied to a published data set containing core measurement data from several different shale formations: Bakken, Bazhenov, Niobrara, Monterey, North Sea, Japan, Lockatong and Woodford. The stiffness coefficients predicted from the combination model described herein are plotted in FIGS. 12-18 against measured values to illustrate the prediction quality. FIG. 12 compares the measured and predicted values for the stiffness coefficient $C_{11}$, where the predicted values are determined with Equation (13). FIG. 13 compares the measured and predicted values for the stiffness coefficient $C_{66}$, where the predicted values are determined with the modified ANNIE model. FIG. 14 compares the measured and predicted values for the stiffness coefficient $C_{66}$, where the predicted values are determined with the $V_{sh}(45)$. FIG. 15 compares the measured and predicted values for the stiffness coefficient $C_{12}$. FIG. 16 compares the measured and predicted values for the stiffness coefficient $C_{13}$, where the predicted values are determined with the D. FIG. 17 compares the measured and predicted values for the stiffness coefficient $C_{13}$, where the predicted values are determined with the modified ANNIE model. FIG. 18 compares the measured and predicted values for the stiffness coefficient $C_{13}$, where the predicted values are determined with the SWR: all parameters. In each of FIGS. 12-18, the linear correlation of predicted vs. measured values and the corresponding R squared are presented. The slope of the linear trendline can be understood as bias; value closer to 1 means less bias. The R squared can be used as a measure of scatter; value closer to 1 indicates less scatter of the prediction.

More specifically, the combination model described herein according to the workflow illustrated in FIG. 8 was applied to a published data set. The 45° p- and s-sonic wave velocities were first obtained from the 0° velocities by using Equations (6) and/or (7) and/or stepwise regression. Meanwhile, $C_{33}$ and $C_{44}$ were calculated from the 0° p- and s-wave velocities, respectively. Then, $K_1$ and $K_2$ were used in the modified ANNIE assumptions are calibrated by core data, which is $K_1=1.1064$ and $K_2=0.78$. Following the routine (b) of FIG. 8, $C_{11}$ in $10^6$ psi is first predicted from the regression velocities at 45° (FIG. 12). Then, $C_{66}$ ($10^6$ psi) was obtained from either (1) the linear correlation of Equation (19) (i.e., $C_{11}=1.1064*2[(C_{66}-C_{44})+C_{33}]$) (routine (b) of FIG. 8) or directly from regression $V_{sh}(45)$ (routine (a) of FIG. 8). The results are shown in FIGS. 13 and 14, respectively.

Comparing the results in FIGS. 13 and 14, it was observed that $C_{66}$ obtained from the modified ANNIE assumption has a better match with the measure $C_{66}$. So, the $C_{66}$ from the routine (b) was utilized to predict $C_{12}$ ($10^6$ psi). The results are shown in FIG. 15.

Based on $C_{12}$ calculated in FIG. 15, there are three ways to calculate $C_{13}$. The first method (FIG. 16) was based on the calculated D. Its prediction quality is highly affected by the goodness-of-fit of linear regression of wave velocities. The second method (FIG. 17) relied on the linear relationship between $C_{13}$ and $C_{12}$. Its prediction quality can be poor for some organic shales where the relationship between $C_{13}$ and $C_{12}$ has been observed to be non-linear, affected by the presence of kerogen and clay. The third method (FIG. 18) was the extension of the second one by including more influence factors other than $C_{12}$, when poor $C_{13}$-$C_{12}$ linear relationship is observed. In the third method, by using the SWR for multiple inputs, the most important input parameters can be selected and correlated with $C_{13}$. In this study, the critical influence inputs were $C_{12}$, $C_{33}$, $C_{44}$, rock density, and $V_{kerogen}$. Comparing FIGS. 16-18, FIG. 18 yields the better predictions of $C_{13}$ with less bias and scatter than the other two.

Figure 19:
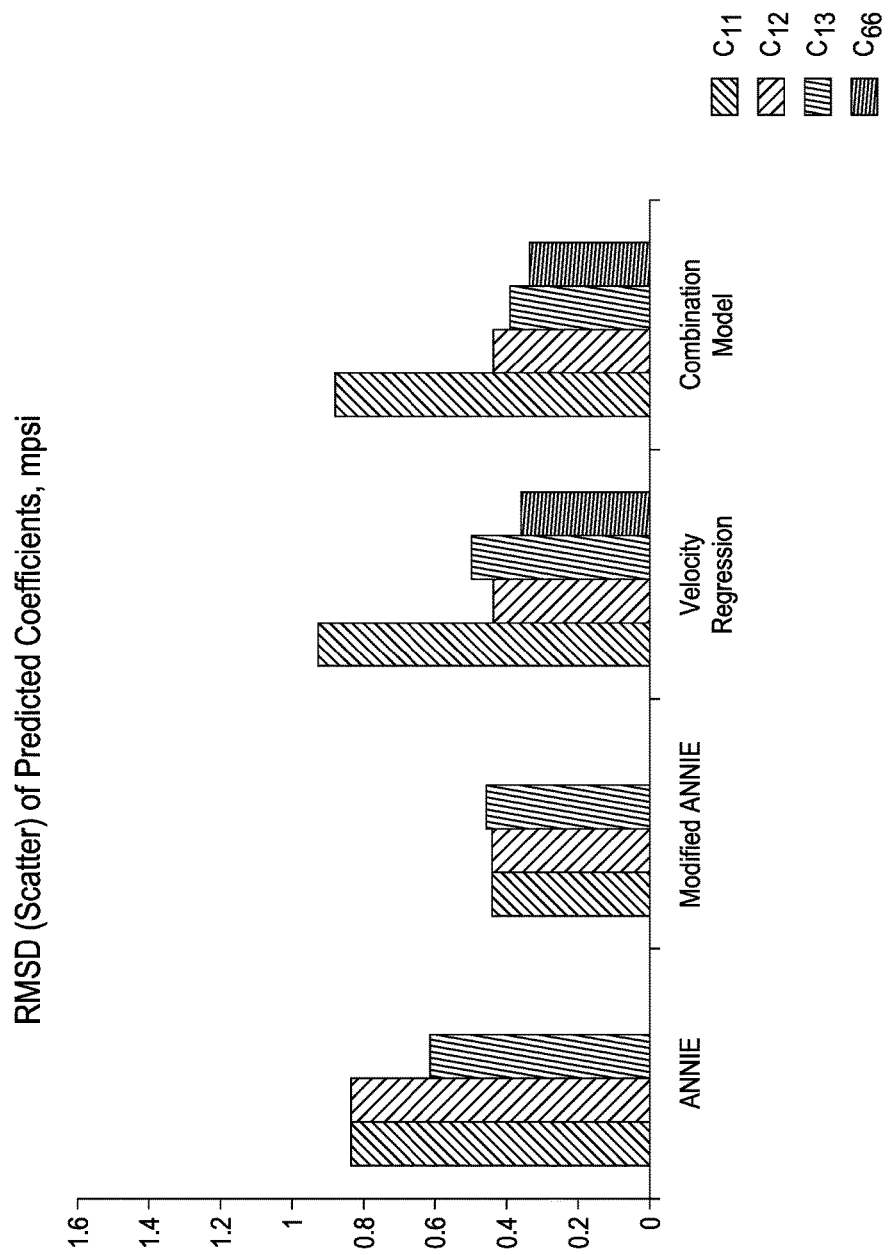
FIG. 19 illustrates the RMSD of the predicted stiffness coefficients vs. measured values for different models.
Figure 20:
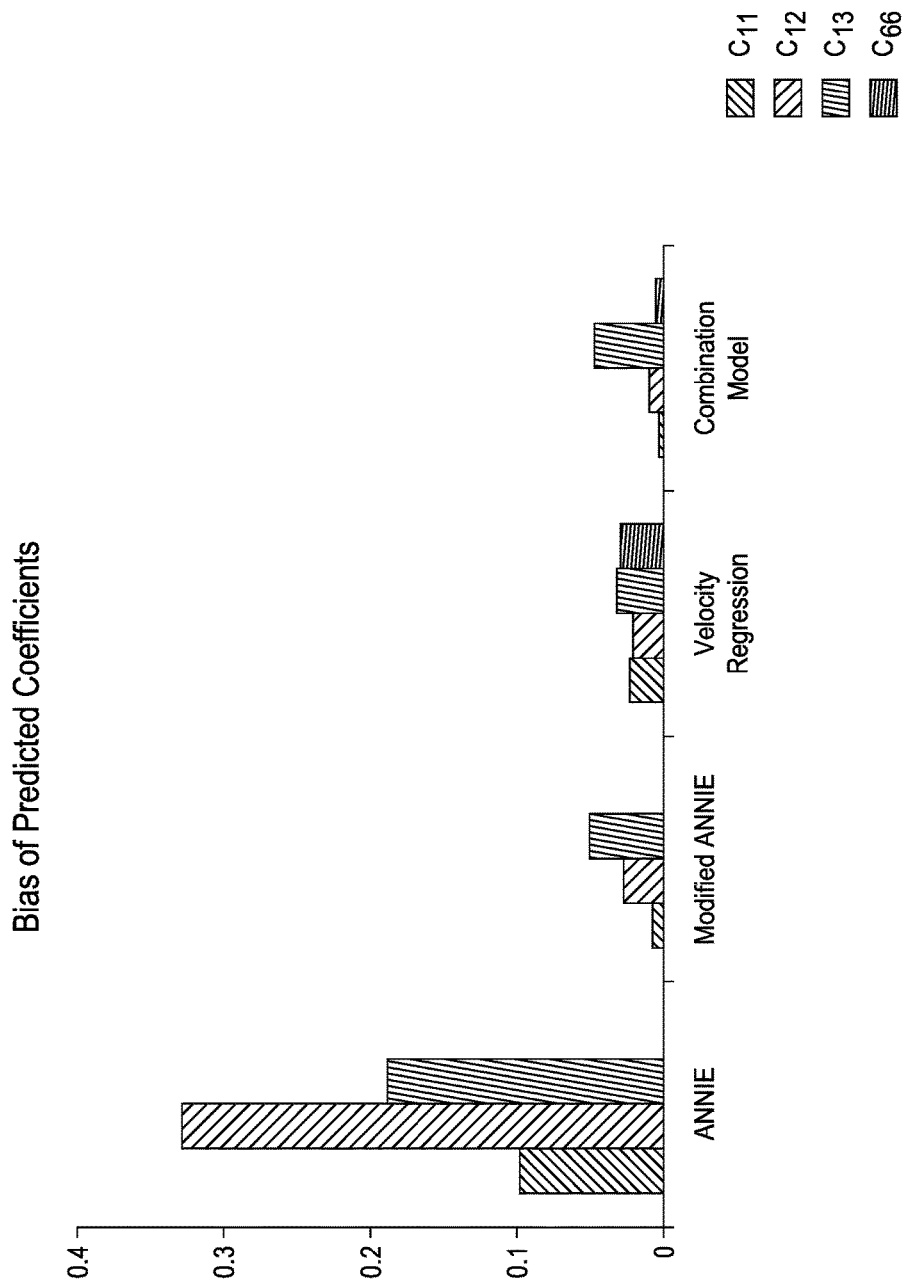
FIG. 20 compares the prediction bias of different models.

To evaluate the prediction quality of the newly developed combination model, the current results from the combination model are compared with the results predicted by the other previous models: the ANNIE model, the modified ANNIE model, and the velocity regression (V-reg) method. FIG. 19 illustrates the RMSD of the predicted stiffness coefficients vs. measured values for different models. The larger the RMSD value, the more scatter the model has. FIG. 20 compares the prediction bias of different models. The bias is calculated by (1-slope of trendline of predicted vs. measured values). Zero means no bias. The larger the bias value, the worse prediction given by the model. According to these results, all models except ANNIE provide good predictions to $C_{11}$, $C_{12}$ and $C_{13}$. The combination model did a better job in predicting $C_{66}$ than the velocity regression model. Considering that the new model is capable of predicting $C_{66}$ without the Stoneley wave velocity as an input, it shows good potential in stiffness coefficient prediction for the cased-hole condition or monopole logging condition. Further, the combination model described herein may be used as a reference model to validate or verify the results interpreted by the other conventional models for the conditions where the Stoneley wave velocity can be measured by employing advanced sonic tools.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:
1. A method comprising:
obtaining sonic logging data that includes 0° p-wave velocities ($V_p(0°)$) and 0° s-wave velocities ($V_s(0°)$) for a well extending parallel or substantially parallel to a transverse isotropic axis of a surrounding formation, wherein the $V_s(0°)$ is 0° s-wave velocity with vertical polarization ($V_{sv}(0°)$) or 0° s-wave velocity with horizontal polarization ($V_{sh}(0°)$) because $V_s(0°)=V_{sv}(0°)=V_{sh}(0°)$;

deriving one selected from the group consisting of: a first correlation between 45° p-wave velocities ($V_p(45°)$) and the $V_p(0°)$, a second correlation between 45° s-wave velocities with vertical polarization ($V_{sv}(45°)$) and the $V_{sv}(0°)$, a third correlation between 45° s-wave velocities with horizontal polarization ($V_{sh}(45°)$) and the $V_{sh}(0°)$, and any combination thereof;

calculating $C_{33}$ and $C_{44}$ stiffness coefficients based on the $V_p(0°)$ and the $V_{sv}(0°)$, respectively;

calculating $C_{11}$ and $C_{66}$ stiffness coefficients based on one selected from the group consisting of: the first correlation, the second correlation, the third correlation, and any combination thereof;

calculating a $C_{12}$ stiffness coefficient based on the $C_{11}$ and $C_{66}$ stiffness coefficients;

calculating a $C_{13}$ stiffness coefficient based on one selected from the group consisting of: (A) the $C_{11}$, $C_{33}$, and $C_{44}$ stiffness coefficients, (B) an ANNIE model, (C) a modified ANNIE model, (D) a stepwise regression based on selected core data, and (E) any combination thereof; and characterizing the surrounding formation corresponding to the sonic logging data based on the $C_{33}$, $C_{44}$, $C_{66}$, $C_{11}$, $C_{12}$, and $C_{13}$ stiffness coefficients.

2. The method of claim 1, wherein calculating the $C_{33}$, $C_{44}$, $C_{66}$, $C_{11}$, $C_{12}$, and $C_{13}$ stiffness coefficients does not use Stoneley wave velocity data.

3. The method of claim 1, wherein deriving one or more of the first, second, or third correlations is based on $V_i(45°) = A_i V_i(0°) + B_i$ where A and B are regression coefficients and i is p, sv, or sh for the first, second, or third correlations, respectively.

4. The method of claim 1, wherein deriving one or more of the first, second, or third correlations is based on $V_i(45°) = A'_i V_s(0°) + B'_i V_p(0°) + C'_i$ where A', B' and C' are regression coefficients and i is p, sv, or sh for the first, second, or third correlations, respectively.

5. The method of claim 1, wherein calculating the $C_{33}$ and $C_{44}$ stiffness coefficients is based on $C_{33} = \rho V_p^2(0°)$ and $C_{44} = \rho V_{sv}^2(0°)$, where $\rho$ is a rock density.

6. The method of claim 1, wherein calculating the $C_{11}$ and $C_{66}$ stiffness coefficients is based on one selected from the group consisting of: (A) $C_{11} = 2\rho V_p^2(45°) + 2\rho V_{sv}^2(45°) - C_{33} - 2C_{44}$ and $C_{11} = 2\rho V_p^2(45°) + 2\rho V_{sv}^2(45°) - C_{33} - 2C_{44}$; (B) $C_{11} = 2\rho V_p^2(45°) + 2\rho V_{sv}^2(45°) - C_{33} - 2C_{44}$ and $C_{11} = K_1(2(C_{66} - C_{44}) + C_{33})$; and (C) $C_{11} = 2\rho V_p^2(45°) + 2\rho V_{sv}^2(45°) - C_{33} - 2C_{44}$ and $C_{11} = K_1(2(C_{66} - C_{44}) + C_{33})$, where $K_1$ is an empirical constant derived from core data and $\rho$ is a rock density.

7. The method of claim 1, wherein calculating the $C_{12}$ stiffness coefficient is based on $C_{12} = C_{11} - 2C_{66}$.

8. The method of claim 1, wherein calculating the $C_{13}$ stiffness coefficient is based on the $C_{11}$, $C_{33}$, and $C_{44}$ stiffness coefficients using $D = \rho V_p^2(45°) - \rho V_{sv}^2(45°)$ and $$C_{13} = \sqrt{D^2 - 0.25(C_{33} - C_{11})^2} - C_{44},$$

where $\rho$ is a rock density.

9. The method of claim 1, wherein characterizing the surrounding formation involves calculating a horizontal Young's Modulus ($E_h$) according to $$E_h = \frac{(C_{11} - C_{12}) * (C_{11}C_{33} - 2C_{13}^2 + C_{12}C_{33})}{C_{11}C_{33} - C_{13}^2},$$

a horizontal Poisson's Ratio ($v_h$) according to $$v_h = \frac{C_{33}C_{12} + C_{13}^2}{C_{33}C_{11} - C_{13}^2},$$

a vertical Young's Modulus ($E_v$) according to $$E_v = C_{33} - \frac{2C_{13}^2}{C_{11} - C_{12}},$$

and a vertical Poisson's Ratio ($v_v$) according to $$v_v = \frac{C_{13}}{C_{11} + C_{12}}.$$

10. The method of claim 9 further comprising:
calculating a minimum horizontal stress ($\sigma_{Hmin}$) of the formation by $$\sigma_{Hmin} = \frac{E_h}{E_v} \frac{v_v}{1 - v_h} [\sigma_v - \alpha(1 - \xi)p_p] + \alpha p_p + \frac{E_h}{1 - v_h^2} \epsilon H_{min} + \frac{E_h v_h}{1 - v_h^2} \epsilon H_{max},$$

where $\sigma_v$ is the overburden stress gradient (psi/ft), $\alpha$ is Biot's elastic constant, $\xi$ is a poroelastic constant, $p_p$ is a pore pressure gradient, $\epsilon H_{max}$ is a maximum horizontal strain, and $\epsilon H_{min}$ is a minimum horizontal strain.

11. The method of claim 10 further comprising:
determining a closure fracture pressure gradient is determined based on the minimum horizontal stress.

12. The method of claim 11 further comprising controlling a well completion operation based on the closure fracture pressure gradient.

13. The method of claim 1, wherein characterizing the surrounding formation involves performing a stage/perforation design based on the $C_{33}$, $C_{44}$, $C_{66}$, $C_{11}$, $C_{12}$, and $C_{13}$ stiffness coefficients.

14. The method of claim 13, wherein the stage/perforation design produces perforation parameters and the method further comprises perforating a vertical well penetrating the surrounding formation based on the perforation parameters.

15. The method of claim 1, wherein characterizing the surrounding formation involves performing a hydraulic fracturing model based on the $C_{33}$, $C_{44}$, $C_{66}$, $C_{11}$, $C_{12}$, and $C_{13}$ stiffness coefficients.

16. The method of claim 15, wherein the hydraulic fracturing model produces fracturing parameters and the method further comprises performing a fracturing operation based on the fracturing parameters.

17. The method of claim 1, wherein characterizing the surrounding formation involves performing a stage/perforation design and a hydraulic fracturing model based on the $C_{33}$, $C_{44}$, $C_{66}$, $C_{11}$, $C_{12}$, and $C_{13}$ stiffness coefficients to produce perforation and fracturing parameters, and wherein the method further comprises perforating the vertical well and performing a fracturing operation based on the perforation and fracturing parameters.

18. The method of claim 1, wherein obtaining sonic logging data involves measuring sonic logging data.

19. The method of claim 1, wherein obtaining sonic logging data involves computing synthetic sonic data from porosity and minerology data obtained from logging data.

20. A method comprising:
obtaining sonic logging data that includes 90° p-wave velocities ($V_p(90°)$), 90° s-wave velocities with vertical polarization ($V_{sv}(90°)$), and 90° s-wave velocities with horizontal polarization ($V_{sh}(90°)$) a well extending perpendicular or substantially perpendicular to a transverse isotropic axis of a surrounding formation;
calculating $C_{11}$, $C_{66}$, and $C_{44}$ stiffness coefficients based on the) $V_p(90°)$, the $V_{sh}(90°)$, and the $V_{sv}(90°)$, respectively;
deriving one selected from the group consisting of: a first correlation between 45° p-wave velocities ($V_p(45°)$) and the $V_p(90°)$, a second correlation between 45° s-wave velocities ($V_{sv}(45°)$) and the $V_{sv}(90°)$, and any combination thereof;
calculating a $C_{33}$ stiffness coefficient based on one selected from the group consisting of: (A) the first and second correlations; (B) the $C_{11}$, $C_{66}$, and $C_{44}$ stiffness coefficients; and (C) a combination thereof;
calculating a $C_{12}$ stiffness coefficient based on the $C_{11}$ and $C_{66}$ stiffness coefficients;
calculating a $C_{13}$ stiffness coefficient based on one selected from the group consisting of: (A) the $C_{11}$, $C_{33}$, and $C_{44}$ stiffness coefficients, (B) an ANNIE model, (C) a modified ANNIE model, (D) a stepwise regression based on selected core data, and (E) any combination thereof; and
characterizing the surrounding formation corresponding to the sonic logging data based on the $C_{33}$, $C_{44}$, $C_{66}$, $C_{11}$, $C_{12}$, and $C_{13}$ stiffness coefficients.

21. The method of claim 20, wherein calculating the $C_{33}$, $C_{44}$, $C_{66}$, $C_{11}$, $C_{12}$, and $C_{13}$ stiffness coefficients does not use Stoneley wave velocity data.

22. The method of claim 20, wherein calculating the $C_{11}$, $C_{66}$, and $C_{44}$ stiffness coefficients is based on $C_{11}=\rho V_p^2$ (90°), $C_{66}=\rho V_{sh}^2$ (90°), and $C_{44}=\rho V_{sv}^2$ (90°) respectively, where $\rho$ is a rock density.

23. The method of claim 20, wherein deriving one or both of the first and second correlations is based on $V_i(45°)=E_i V_i(90°)+F_i$, where E and F are regression coefficients and i is p or sv for the first or second correlation, respectively.

24. The method of claim 20, wherein deriving one or both of the first and second correlations is based on $V_i(45°)=E'_i V_{sv}(90°)+F'_i V_{sh}(90°)+G'_i V_p(90°)+H'_i$, where E', F', G', and H' are regression coefficients and i is p or sv for the first or second correlation, respectively.

25. The method of claim 20, wherein calculating the $C_{33}$ stiffness coefficient based on the first and second correlations according to $C_{11}=2\rho V_p^2(45°)+2\rho V_{sv}^2(45°)-C_{33}-2C_{44}$, where $\rho$ is a rock density.

26. The method of claim 20, wherein calculating the $C_{33}$ stiffness coefficient based on the $C_{11}$, $C_{66}$, and $C_{44}$ stiffness coefficients according to $C_{11}=K_1(2(C_{66}-C_{44})+C_{33})$, where $K_1$ is an empirical constant derived from core data.

27. The method of claim 20, wherein calculating the $C_{12}$ stiffness coefficient based on $C_{12}=C_{11}-2C_{66}$.

28. The method of claim 20, wherein calculating the $C_{13}$ stiffness coefficient is based on the $C_{11}$, $C_{33}$, and $C_{44}$ stiffness coefficients using $D=\rho V_p^2(45°)-\rho V_{sv}^2(45°)$ and $$C_{13} = \sqrt{D^2 - 0.25(C_{33}-C_{11})^2} - C_{44},$$

where $\rho$ is a rock density.

29. A system comprising:
a processing unit; and
a memory coupled to the processing unit, wherein the memory stores software that, when executed, causes the processing unit to:
obtain sonic logging data that includes 0° p-wave velocities ($V_p(0°)$) and 0° s-wave velocities ($V_s(0°)$) for a well extending parallel or substantially parallel to a transverse isotropic axis of a surrounding formation, wherein the $V_s(0°)$ is 0° s-wave velocities with vertical polarization ($V_{sv}(0°)$) or 0° s-wave velocities with horizontal polarization ($V_{sh}(0°)$) because $V_s(0°)=V_{sv}(0°)=V_{sh}(0°)$;
derive one selected from the group consisting of: a first correlation between 45° p-wave velocities ($V_p(45°)$) and the $V_p(0°)$, a second correlation between 45° s-wave velocities with vertical polarization ($V_{sv}(45°)$) and the $V_{sv}(0°)$, a third correlation between 45° s-wave velocities with horizontal polarization ($V_{sh}(45°)$) and the $V_{sh}(0°)$, and any combination thereof;
calculate $C_{33}$ and $C_{44}$ stiffness coefficients based on the $V_p(0°)$ and the $V_{sv}(0°)$, respectively;
calculate $C_{11}$ and $C_{66}$ stiffness coefficients based on one selected from the group consisting of: the first correlation, the second correlation, the third correlation, and any combination thereof;
calculate a $C_{12}$ stiffness coefficient based on the $C_{11}$ and $C_{66}$ stiffness coefficients;
calculate a $C_{13}$ stiffness coefficient based on one selected from the group consisting of: (A) the $C_{11}$, $C_{33}$, and $C_{44}$ stiffness coefficients, (B) an ANNIE model, (C) a modified ANNIE model, (D) a stepwise regression based on selected core data, and (E) any combination thereof; and
characterize the surrounding formation corresponding to the sonic logging data based on the $C_{33}$, $C_{44}$, $C_{66}$, $C_{11}$, $C_{12}$, and $C_{13}$ stiffness coefficients.

30. A system comprising:
a processing unit; and
a memory coupled to the processing unit, wherein the memory stores software that, when executed, causes the processing unit to:
obtain sonic logging data that includes 90° p-wave velocities ($V_p(90°)$), 90° s-wave velocities with vertical polarization ($V_{sv}(90°)$), and 90° s-wave velocities with horizontal polarization ($V_{sh}(90°)$) a well extending perpendicular or substantially perpendicular to a transverse isotropic axis of a surrounding formation;
calculate $C_{11}$, $C_{66}$, and $C_{44}$ stiffness coefficients based on the) $V_p(90°)$, the $V_{sh}(90°)$, and the $V_{sv}(90°)$, respectively;
derive one selected from the group consisting of: a first correlation between 45° p-wave velocities ($V_p(45°)$) and the $V_p(90°)$, a second correlation between 45° s-wave velocities ($V_{sv}(45°)$) and the $V_{sv}(90°)$, and any combination thereof;
calculate a $C_{33}$ stiffness coefficient based on one selected from the group consisting of: (A) the first and second correlations; (B) the $C_{11}$, $C_{66}$, and $C_{44}$ stiffness coefficients; and (C) a combination thereof;

calculate a $C_{12}$ stiffness coefficient based on the $C_{11}$ and $C_{66}$ stiffness coefficients;

calculate a $C_{13}$ stiffness coefficient based on one selected from the group consisting of: (A) the $C_{11}$, $C_{33}$, and $C_{44}$ stiffness coefficients, (B) an ANNIE model, (C) a modified ANNIE model, (D) a stepwise regression based on selected core data, and (E) any combination thereof; and characterize the surrounding formation corresponding to the sonic logging data based on the $C_{33}$, $C_{44}$, $C_{66}$, $C_{11}$, $C_{12}$, and $C_{13}$ stiffness coefficients.

* * * * *